United States Patent
Sugano

(10) Patent No.: US 8,183,819 B2
(45) Date of Patent: May 22, 2012

(54) HIGH-SPEED CHARGING POWER SUPPLY DEVICE AND HIGH-SPEED CHARGING POWER SUPPLY METHOD

(75) Inventor: Tomio Sugano, Tochigi (JP)

(73) Assignee: Institute for Energy Application Technologies Co., Ltd., Tochigi (JP)

( * ) Notice: Subject to any disclaimer, the term of this patent is extended or adjusted under 35 U.S.C. 154(b) by 0 days.

(21) Appl. No.: 12/527,817

(22) PCT Filed: Feb. 19, 2008

(86) PCT No.: PCT/JP2008/000261
§ 371 (c)(1),
(2), (4) Date: Jul. 20, 2011

(87) PCT Pub. No.: WO2008/102543
PCT Pub. Date: Aug. 28, 2008

(65) Prior Publication Data
US 2011/0266996 A1    Nov. 3, 2011

(30) Foreign Application Priority Data
Feb. 19, 2007 (JP) ................................. 2007-038255

(51) Int. Cl.
*H02J 7/00* (2006.01)
*B60L 1/00* (2006.01)

(52) U.S. Cl. ......... 320/103; 320/104; 307/9.1; 307/10.1

(58) Field of Classification Search .................. 320/103, 320/104
See application file for complete search history.

(56) References Cited

U.S. PATENT DOCUMENTS

| | | | | | |
|---|---|---|---|---|---|
| 3,947,743 | A | * | 3/1976 | Mabuchi et al. | 320/103 |
| 5,162,720 | A | * | 11/1992 | Lambert | 320/104 |
| 5,254,929 | A | * | 10/1993 | Yang | 320/103 |
| 5,633,577 | A | * | 5/1997 | Matsumae et al. | 322/37 |
| 5,952,813 | A | * | 9/1999 | Ochiai | 320/104 |
| 6,734,651 | B2 | * | 5/2004 | Cook et al. | 320/103 |
| 7,042,115 | B2 | * | 5/2006 | Mizutani et al. | 307/10.1 |
| 2004/0051500 | A1 | * | 3/2004 | Kuroda et al. | 320/104 |

FOREIGN PATENT DOCUMENTS

| | | |
|---|---|---|
| JP | 54-001857 A | 1/1979 |
| JP | 02-034150 A | 2/1990 |
| JP | 05-270280 A | 10/1993 |
| JP | 06-209530 A | 7/1994 |
| JP | 06-209530 A | 7/1994 |

(Continued)

*Primary Examiner* — M'Baye Diao
(74) *Attorney, Agent, or Firm* — Arent Fox LLP

(57) ABSTRACT

A boosting-charge power supply apparatus which supplies electric power for charging a mobile body having a boosting-charge control function includes: a rectifier for supplying DC power; a first power storage for storing DC power from the rectifier and outputting DC power; a charging circuit which sends DC power from the first power storage directly to a vehicle including a second power storage for storing DC power from the first power storage; and a power-supply controller for stopping the rectifier from supplying electric power to the first power storage while the first power storage is supplying electric power to charge the second power storage. Through the controller, DC power supplied from the first power storage becomes suitable for charging of the second power storage on the vehicle side, thereby enabling the same boosting-charge power supply apparatus to supply electric power and give a boosting charge to a different type of vehicle.

16 Claims, 16 Drawing Sheets

FOREIGN PATENT DOCUMENTS

| | | |
|---|---|---|
| JP | 07-503837 A | 4/1995 |
| JP | 07-115732 A | 5/1995 |
| JP | 07-250405 A | 9/1995 |
| JP | 07-304338 A | 11/1995 |
| JP | 2000-253508 A | 9/2000 |
| JP | 3211323 B2 | 9/2001 |
| JP | 2005-295616 A | 10/2005 |
| JP | 2006-020438 A | 1/2006 |

* cited by examiner

HIGH-SPEED CHARGING POWER SUPPLY DEVICE AND HIGH-SPEED CHARGING POWER SUPPLY METHOD

This application is a National Stage entry of International Application No. PCT/JP2008/000261, filed Feb. 19, 2008, the disclosure of the prior application is hereby incorporated in its entirety by reference.

TECHNICAL FIELD

The present invention relates to a boosting-charge power supply apparatus and a boosting-charge power supply method capable of supplying electric power for boosting charge to a mobile body such as a vehicle and a ship.

BACKGROUND ART

An electric vehicle, emitting no exhaust gas and environment-friendly, has the problem of taking a relatively long time to charge. In order to shorten the charge time, the electric vehicle has to be given a great amount of electric power in a short time, thereby requiring power equipment having a larger power capacity in a location where only a low-voltage power line is laid. Hence, an electric vehicle is generally given a boosting charge by rectifying commercial AC power, storing DC power in a storage battery and utilizing the stored DC power (refer to Patent Documents 1 and 2). Patent Document 1 offers a charging apparatus including only one charger, the charger being switched using a change-over switch and thereby charging both a storage battery for equipment and a storage battery for an electric vehicle. Patent Document 2 offers a charging apparatus including a daytime storage battery storing electric power in the daytime and a nighttime storage battery storing electric power in the nighttime, in which residual electric power in the nighttime storage battery can be supplied via a charger to a storage battery for an electric vehicle during the daytime.

Patent Document 1: Japanese Patent Laid-Open Publication No. 5-20768

Patent Document 2: Japanese Patent Publication No. 3334118

DISCLOSURE OF THE INVENTION

Problems to be Solved by the Invention

However, the charging apparatuses according to Patent Documents 1 and 2 have charging conditions set based on the specification of a storage battery mounted on an electric vehicle and cannot charge a vehicle having different charging conditions, thereby restricting vehicle types to be charged and requiring a plurality of charging apparatuses capable of charging a plurality of vehicles having various charging conditions. Besides, if the charging apparatuses output inferior-quality electric power having a ripple, a noise or a surge, it may adversely affect a storage battery mounted on a vehicle.

If a vehicle has a boosting-charge control function suitable for a storage battery, then a single power supply apparatus can give a boosting charge to a variety of vehicles, thereby spreading electric vehicles more widely. Therefore, in order to promote the spread of electric vehicles, it is important to develop a boosting-charge power supply apparatus capable of supplying electric power for boosting charge to various vehicles. Besides, if a vehicle is supplied with high-quality electric power, there is no need to consider a noise, a surge or the like in the supplied power, thereby facilitating a design for electric circuits of the vehicle. Nowadays, improving the global environment has become a pressing task, thereby seeking for environmental-technology advancement in the sectors of vehicles, as well as other mobile bodies emitting exhaust gases including shipping and aircraft.

Therefore, it is an object of the present invention to provide a boosting-charge power supply apparatus and a boosting-charge power supply method capable of supplying electric power for boosting charge to a variety of mobile bodies using a single apparatus and supplying high-quality electric power to the mobile bodies.

Means for Solving the Problems

In order to accomplish the object, a boosting-charge power supply apparatus according to claim 1 which supplies electric power for boosting charge to a mobile body having a boosting-charge control function includes: a power supplying means for supplying DC power; a first power storing means for storing DC power from the power supplying means and outputting pure DC power; a charging circuit which sends pure DC power from the first power storing means directly to a mobile body including a second power storing means for storing DC power from the first power storing means; and a power-supply controlling means for stopping the power supplying means from supplying electric power to the first power storing means while the first power storing means is supplying electric power to charge the second power storing means.

A boosting-charge power supply method according to claim 2 which supplies electric power for boosting charge to a mobile body having a boosting-charge control function includes the steps of: storing DC power from a power supplying means in a first power storing means; sending pure DC power outputted from the first power storing means, through a charging circuit, directly to a mobile body including a second power storing means for storing DC power from the first power storing means; and stopping the power supplying means from supplying electric power to the first power storing means while the first power storing means is supplying electric power to charge the second power storing means.

A boosting-charge power supply apparatus or a boosting-charge power supply method according to claim 3 is characterized in that, in the boosting-charge power supply apparatus according to claim 1 or the boosting-charge power supply method according to claim 2, the first power storing means has a plurality of the charging circuits connected in parallel thereto to thereby give a boosting charge simultaneously to a plurality of the mobile bodies.

A boosting-charge power supply apparatus according to claim 4 is characterized in that, in the boosting-charge power supply apparatus according to claim 1, the charging circuit includes a switching means for switching the charging circuit at least based on charge information from the mobile body.

A boosting-charge power supply method according to claim 5 is characterized in that, in the boosting-charge power supply method according to claim 2, a part of DC power supplied from the first power storing means is used for cooling a heat-generation part in a charging system of the mobile body.

A boosting-charge power supply apparatus according to claim 6 is characterized in that, in the boosting-charge power supply apparatus according to claim 1, the power supplying means is formed by a rectifier converting inputted AC power into DC power.

A boosting-charge power supply apparatus according to claim 7 is characterized in that, in the boosting-charge power supply apparatus according to claim 6, the power-supply controlling means has the function of allowing the rectifier to supply DC power to the first power storing means only for specified hours.

A boosting-charge power supply apparatus according to claim 8 is characterized in that, in the boosting-charge power supply apparatus according to claim 1, the power supplying means is formed by a fuel battery.

A boosting-charge power supply apparatus according to claim 9 is characterized in that, in the boosting-charge power supply apparatus according to claim 1, the first power storing means is formed by at least either of a storage battery and an electric double-layer capacitor.

A boosting-charge power supply apparatus according to claim 10 is characterized in that, in the boosting-charge power supply apparatus according to claim 6, the AC power inputted in the rectifier is generated with renewable energy.

A boosting-charge power supply apparatus according to claim 11 is characterized in that, in the boosting-charge power supply apparatus according to claim 8, the fuel battery utilizes, as a fuel, hydrogen obtained by reforming a fossil fuel.

A boosting-charge power supply apparatus according to claim 12 is characterized in that, in the boosting-charge power supply apparatus according to claim 8, the fuel battery utilizes, as a fuel, hydrogen produced using electric power generated with renewable energy.

A boosting-charge power supply apparatus according to claim 13 is characterized in that, in the boosting-charge power supply apparatus according to claim 8, the fuel battery has an inverter connected thereto converting DC power outputted from the fuel battery into AC power and supplying the AC power to a commercial power-supply system.

A boosting-charge power supply apparatus or a boosting-charge power supply method according to claim 14 is characterized in that, in the boosting-charge power supply apparatus according to claim 1 or the boosting-charge power supply method according to claim 2, the mobile body is at least any one of a vehicle, a ship and an aircraft.

Advantages of the Invention

In the boosting-charge power supply apparatus according to claim 1 and the boosting-charge power supply method according to claim 2, when the mobile body is charged, the power-supply controlling means separates the power supplying means and the first power storing means electrically to thereby allow only the first power storing means to supply electric power to the mobile body. The mobile body having the boosting-charge control function executes control in such a way that pure DC power supplied from the first power storing means becomes electric power suitable for the charging conditions of the second power storing means, thereby enabling the same boosting-charge power supply apparatus to supply electric power and give a boosting charge to a different type of mobile body. The boosting-charge control function is extremely significant because it may affect the life or the like of the second power storing means. In designing a mobile body having a boosting-charge control function, the boosting-charge control function can be determined by fully studying characteristics of the second power storing means. Conventionally, a boosting-charge apparatus and a mobile body such as a vehicle are each produced by a separate manufacturer, but a mobile body is provided with a boosting-charge control function, thereby enabling the mobile-body manufacturer to design the second power storing means and the boosting-charge control function together. This makes it possible to design the second power storing means in such a way that it has a higher performance, thereby enhancing the mobility of the mobile body. Besides, the mobile body can be supplied with high-quality electric power equivalent to pure DC power, thereby almost saving considering a noise, a surge or the like in designing electric circuits of the mobile body, so that the electric circuits of the mobile body can be more easily designed.

In the boosting-charge power supply apparatus or boosting-charge power supply method according to claim 3, the first power storing means has the plurality of charging circuits connected in parallel thereto to thereby give a boosting charge simultaneously to the plurality of mobile bodies having different charging conditions.

In the boosting-charge power supply apparatus according to claim 4, the charging circuit includes the switching means for switching the charging circuit at least based on charge information from the mobile body. This makes it possible, for example, to automatically stop charging the mobile body if completing it, or forcedly stop charging the mobile body even while charging it.

In the boosting-charge power supply method according to claim 5, while charging the mobile body, a heat-generation part in a charging system of the mobile body is cooled using DC power supplied from the first power storing means. Therefore, in order to cool the charging system, there is no need to supply the mobile body with a coolant from outside, thereby simplifying the cooling structure.

In the boosting-charge power supply apparatus according to claim 6, the power supplying means is formed by a rectifier converting AC power into DC power. Hence, a boosting-charge station may be easily constructed in a location where a power line is laid.

In the boosting-charge power supply apparatus according to claim 7, the power-supply controlling means has the function of allowing the rectifier to supply DC power to the first power storing means only for specified hours. Therefore, the first power storing means can be supplied, for example, with surplus commercial power during the nighttime, thereby leveling the power load.

In the boosting-charge power supply apparatus according to claim 8, the power supplying means is formed by a fuel battery. Therefore, electric power can be generated even in a location where commercial electric power is difficult to supply, thereby facilitating the construction of a charging station.

In the boosting-charge power supply apparatus according to claim 9, the first power storing means is formed by at least either of a storage battery and an electric double-layer capacitor. Therefore, a higher energy density can be obtained, thereby storing a greater amount of electric power even in a relatively small storage space.

In the boosting-charge power supply apparatus according to claim 10, the AC power inputted in the rectifier is generated with renewable energy, thereby different from power generation with a fossil fuel, emitting no carbon dioxide and hence contributing toward improving the global environment.

In the boosting-charge power supply apparatus according to claim 11, the fuel battery utilizes, as a fuel, hydrogen obtained by reforming a fossil fuel. Therefore, electric power can be generated, for example, using fossil fuels stored at a filling station to make boosting charge there feasible, thereby realizing an electric-vehicle society where fossil fuels are moderately consumed.

In the boosting-charge power supply apparatus according to claim 12, the fuel battery utilizes, as a fuel, hydrogen produced using electric power generated with renewable energy. Hence, there is no need for any fossil fuel to generate electric power, thereby saving energy resources and improving the environment.

In the boosting-charge power supply apparatus according to claim 13, DC power outputted from the fuel battery can be converted into AC power and supplied to a commercial power-supply system, thereby utilizing electric power from the fuel battery not only for giving the mobile body a boosting charge but also for a dispersed power system.

In the boosting-charge power supply apparatus or boosting-charge power supply method according to claim 14, the mobile body is at least any one of a vehicle, a ship and an aircraft, thereby prompting the use of mobile bodies utilizing electricity as energy in every transportation sector to reduce the amount of carbon-dioxide emission on a global scale.

DESCRIPTION OF THE SYMBOLS

Figure 1:
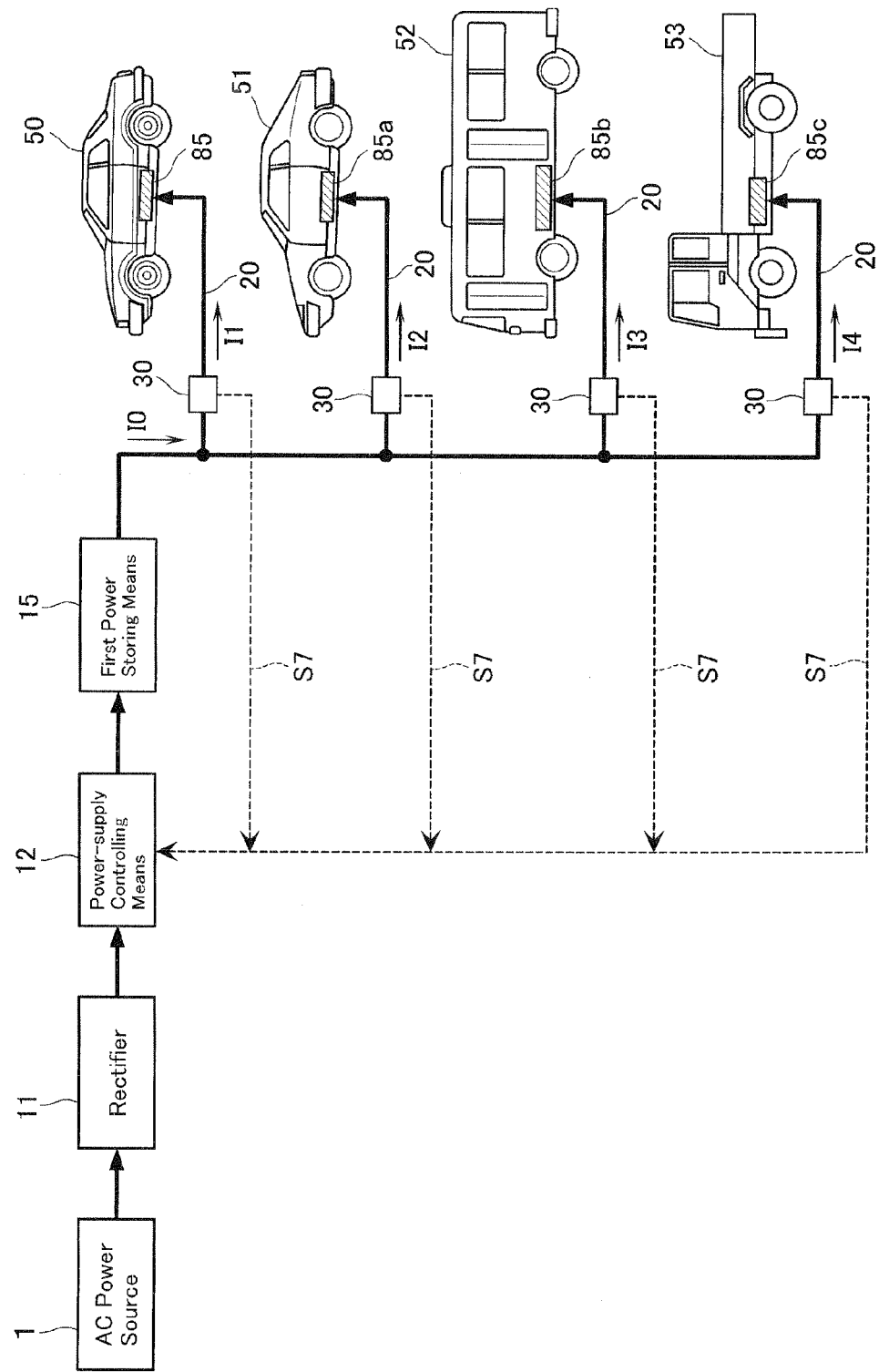
FIG. 1 is a schematic block diagram showing a boosting-charge power supply apparatus according to a first embodiment of the present invention.

1 AC power source
4 fossil fuel
5 reforming apparatus
6 hydrogen
10 boosting-charge power supply apparatus
11 rectifier (power supplying means)
12 power-supply controlling means
15 first power storing means
20 charging circuit
21 charging stand
23 operation section
26 display section
30 switching means
31 switch
32 switching control section
36 charging plug
50 vehicle (mobile body)
60 cooling unit
61 electronic cooling element
65 charging connector
80 charge controlling means
81 power control section
82 charge control unit
83 temperature control unit
84 charge-information processing section
85 second power storing means
93 capacity deciding means
100 ship (mobile body)
110 aircraft (mobile body)
120 fuel battery (power supplying means)
121 inverter

BEST MODE FOR CARRYING OUT THE INVENTION

Next, embodiments of the present invention will be described in detail with reference to the drawings.

First Embodiment

Figure 2:
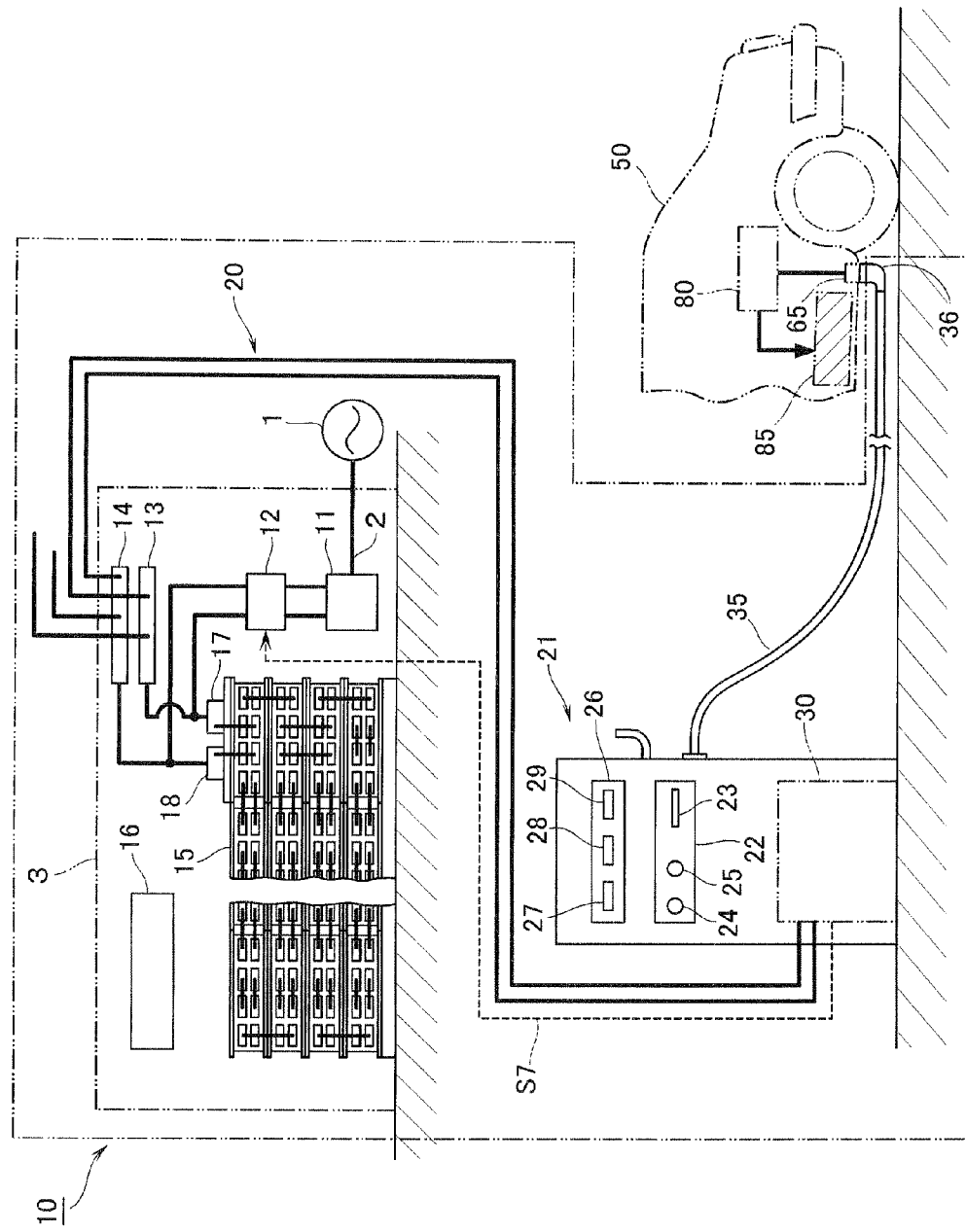
FIG. 2 is a front view of a first power storing means and a charging stand in the apparatus of FIG. 1.

FIGS. 1 to 9 show a boosting-charge power supply apparatus according to a first embodiment of the present invention. In FIG. 2, reference numeral 1 denotes a commercial AC power source such as a three-phase AC power source which supplies electric power through a power line 2 into a construction 3. The construction 3 houses: a rectifier 11 as a power supplying means constituting a boosting-charge power supply apparatus 10; a power-supply controlling means 12; a first power storing means 15; and other equipment. The rectifier 11 is connected on the input side to the power line 2 inside of the construction 3 and has the function of converting three-phase AC power from the power line 2 into DC power after regulating it to a predetermined voltage. On the output side, the rectifier 11 is connected via the power-supply controlling means 12 to the first power storing means 15. As described later, the power-supply controlling means 12 has the function of stopping the rectifier 11 from supplying DC power to the first power storing means 15 based on a signal S7 from a switching means 30.

The first power storing means 15 having the function of storing DC power from the rectifier 11 may be any type as long as it can store DC power and in this embodiment, it is formed by at least either of a storage battery and an electric double-layer capacitor. The first power storing means 15 may be formed, for example, by only a valve-regulated lead-acid battery having many cells connected in series, both a storage battery and a double-layer capacitor, or a large-capacity double-layer capacitor alone. Further, the storage battery may be formed by a large-capacity lithium-ion battery, though it is expensive. The rectifier 11 has the function of charging the first power storing means 15 in consideration of charging characteristics thereof. In this implementation, the first power storing means 15 has an open-circuit voltage, for example, of approximately DC 350 volts, but it is variable by changing the number of cells.

As shown in FIG. 2, the first power storing means 15 includes a positive terminal block 17 and a negative terminal block 18 connected via the power-supply controlling means 12 to the output side of the rectifier 11. The construction 3 houses a positive common terminal block 13 and a negative common terminal block 14 forming a part of a charging circuit 20. The positive common terminal block 13 and negative common terminal block 14 are used for supplying DC power from the first power storing means 15 to a plurality of charging stands 21 outside of the construction 3 and are connected through the charging circuit 20 to the switching means 30 of the charging stand 21. The charging circuit 20 is an electric circuit for supplying pure DC power from the first power storing means 15 up to a vehicle 50 (described later). As shown in FIG. 1, since a plurality of vehicles are simultaneously charged in this embodiment, a plurality of charging circuits 20 are connected in parallel to the positive common terminal block 13 and negative common terminal block 14. In the construction 3, an air conditioner 16 keeping the room temperature substantially constant throughout the year is installed, thereby lengthening the life of the first power storing means 15.

In FIG. 2, the charging stand 21 lies in a charging station near the construction 3 and a plurality of the charging stands 21 are supplied through each charging circuit 20 with DC power from the first power storing means 15. The charging stand 21 is provided on a side thereof with: an operation section 22 including a charge card reader 23, a charge starting switch 24 and a charge forcedly-stopping switch 25; and a display section 26 including a charge power-amount indicator 27, a charging current indicator 28 and a charge power-rate indicator 29. The switching means 30 housed in the charging stand 21 is connected to a charging cable 35 forming a part of the charging circuit 20. The charging cable 35 is held on a side of the charging stand 21 when not used for charge while it extends to the vehicle 50 as a mobile body when used for charge. The charging cable 35 is provided at the front end with a charging plug 36 to be connected to a charging connector 65 of the vehicle 50.

Figure 3:
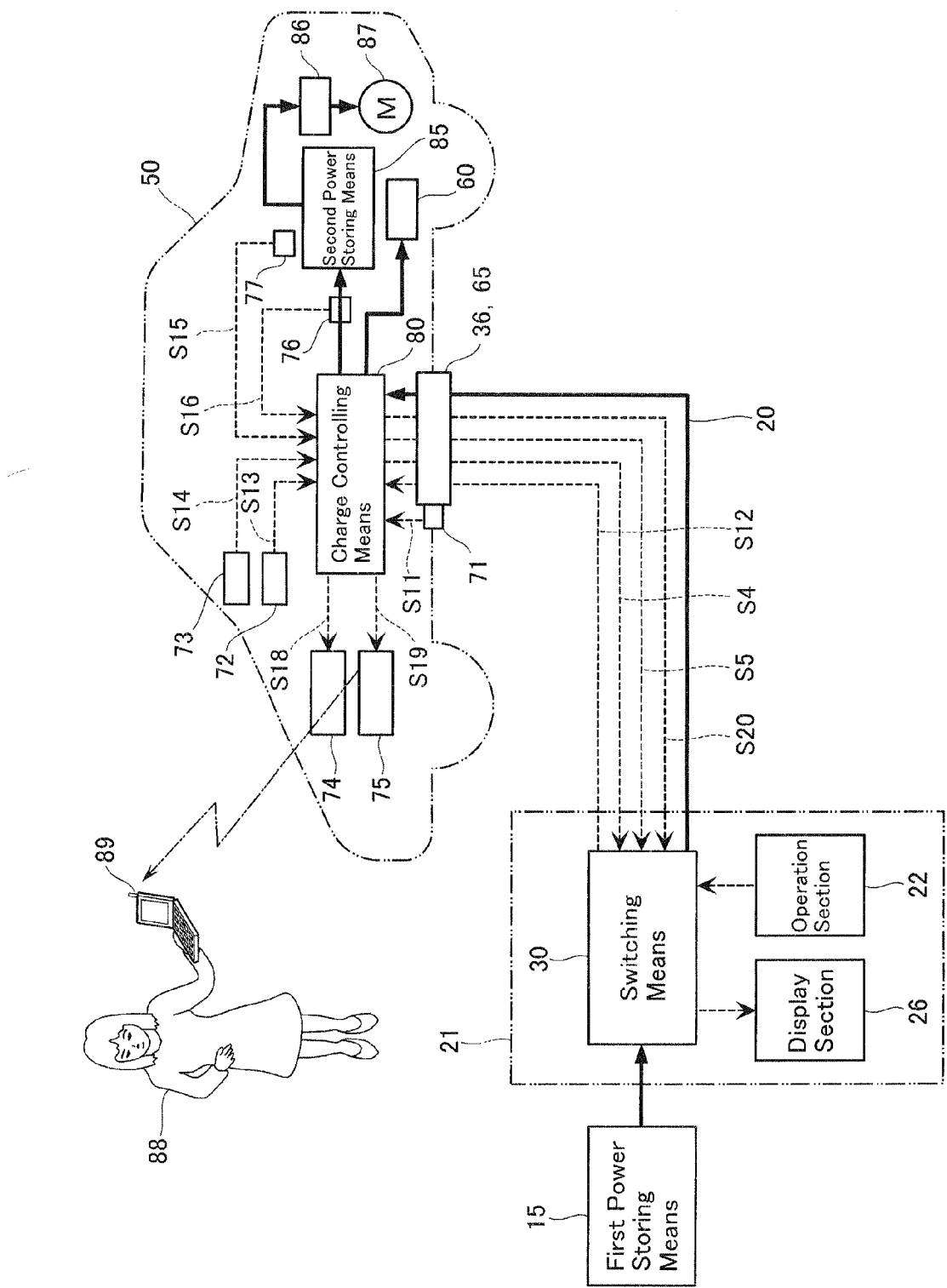
FIG. 3 is an electric circuit diagram showing the connection of a switching means and a vehicle in the apparatus of FIG. 1.

FIG. 3 shows the connection of the charging stand 21 and the vehicle 50 at the time of charging. The charging plug 36 of the charging cable 35 is connected to the charging connector 65 of the vehicle 50 and thereby the first power storing means 15 supplies pure DC power to the vehicle 50 via the switching means 30 in the middle of the charging circuit 20. The switching means 30 has the function of making a switching motion based upon a signal from the operation section 22 of the charging stand 21 or a signal from the vehicle 50 and thereby allowing the first power storing means 15 to supply or stop supplying pure DC power to the vehicle 50. Through the charging circuit 20, therefore, the switching means 30 supplies the pure DC power to the vehicle 50.

Figure 4:
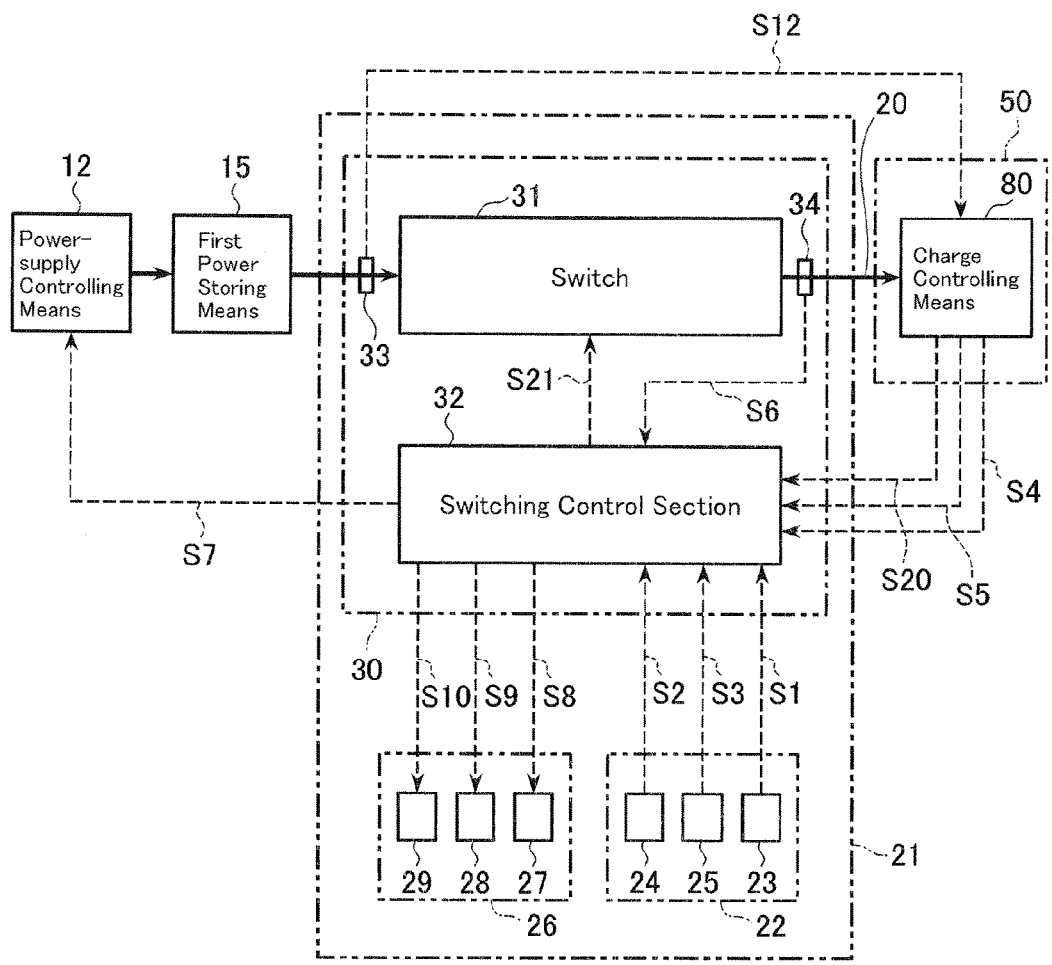
FIG. 4 is an electric circuit diagram of a switching means in the apparatus of FIG. 1.

FIG. 4 shows in detail the switching means 30 including a switch 31 and a switching control section 32. The switch 31 has the switching function of supplying or stopping pure DC power supplied from the first power storing means 15 and is formed by a semiconductor device and an electro-magnetic contactor. The switch 31 making a switching motion based on a signal S21 from the switching control section 32 and is provided on the output side with an electronic-power sensor 34 detecting a voltage and an electric current of DC power on the output side of the switch 31. In the switching control section 32, a signal S6 from the electronic-power sensor 34 is inputted; a signal S1 from the charge card reader 23, a signal S2 from the charge starting switch 24 and a signal S3 from the charge forcedly-stopping switch 25 can be inputted; and further, signals S4, S5 and S20 from a charge controlling means 80 of the vehicle 50 can be inputted. The switching control section 3 has the function of outputting a power-supply stop signal S7 to the power-supply controlling means 12 if necessary in response to each inputted signal. Specifically, if deciding based on an inputted signal that the vehicle 50 is being charged, the switching control section 3 outputs the power-supply stop signal S7 to the power-supply controlling means 12 to thereby stop the first power storing means 15 from supplying DC power. The switching control section 32 outputs signals S8, S9 and S10 to the display section 26 of the charging stand 21. The signal S8 is for indicating a power amount (power supply) from the start of a charge in the charge power-amount indicator 27; S9, indicating a charging current flowing from the switch 31 to the vehicle 50 in the charging current indicator 28; S10, indicating a power rate equivalent to a power amount supplied to the vehicle 50 from the start to the end of a charge in the charge power-rate indicator 29. The switch 31 is provided for convenience, and hence, without the switch 31, the vehicle 50 could be given a boosting charge using the charging circuit 20.

As shown in FIG. 3, the vehicle 50 houses the charge controlling means 80 as well as various apparatuses. The vehicle 50 is supplied with pure DC power, and the charge controlling means 80 controls it to predetermined voltage and current and supplies it to a second power storing means 85. As the second power storing means 85, any type may be used so long as it can store DC power, but in this embodiment, it is formed by at least any one of a storage battery, an electric double-layer capacitor and a lithium-ion capacitor. In this embodiment, the second power storing means 85 is formed, for example, by only a lithium-ion battery having many cells connected in series. However, it may be formed by both a storage battery and a double-layer capacitor or a lithium-ion capacitor. The DC power stored in the second power storing means 85 is supplied via a controller 86 to a running motor 87, so that the vehicle 50 makes a run using the running motor 87 as a drive source. The vehicle 50 is provided with a cooling unit 60 cooling a heat-generation part in the charging system thereof.

Figure 5:
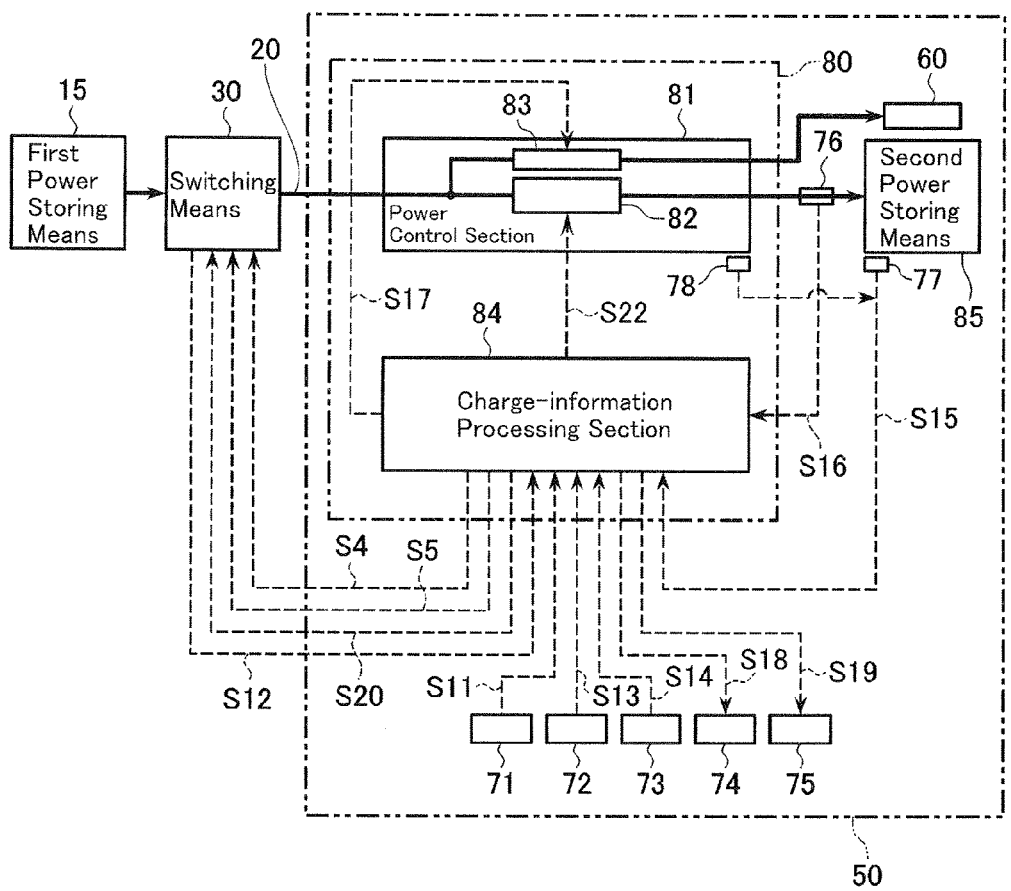
FIG. 5 is an electric circuit diagram of a charge controlling means of a vehicle in the apparatus of FIG. 1.

FIG. 5 shows in detail the charge controlling means 80 including a power control section 81 and a charge-information processing section 84. The power control section 81 is formed by a charge control unit 82 and a temperature control unit 83. The charge control unit 82 has the boosting-charge control function of controlling pure DC power from the switching means 30 to a charging voltage and a charging current suitable for the second power storing means 85. The charge control unit 82 includes a DC chopper circuit (having both a step-up chopper circuit and a step-down chopper circuit) and a current control circuit. On the basis of a control signal S22 from the charge-information processing section 84, the charge control unit 82 gives chopper control to pure DC power supplied from the first power storing means 15 to thereby charge the second power storing means 85 at an optimum charging voltage. An output sensor 76 measures a voltage and an electric current outputted from the charge control unit 82 to the first power storing means 15 and outputs a signal S16 to the charge-information processing section 84. Charging a lithium-ion battery requires precise control especially of the charging voltage, and taking this into account, the charge controlling means 80 controls the charge with a high precision. The charge control unit 82 including the DC chopper circuit having both the step-up chopper circuit and the step-down chopper circuit allows the DC chopper circuit to control the voltage from the first power storing means 15 even if the voltage of the first power storing means 15 gradually drops in charging the vehicle 50 and thereby charges the second power storing means 85 at an optimum charging voltage. Therefore, variations in the output voltage of the first power storing means 15 in a boosting charge cannot affect a charge for the second power storing means 85. Hence, the charge-information processing section 84 has a charge program inputted beforehand for giving optimum charge control to the second power storing means 85 based upon the detected battery voltage and charging current of the second power storing means 85.

As shown in FIG. 5, many signals are inputted in and outputted from the charge-information processing section 8 of the charge controlling means 80. The switch 31 of FIG. 4 is provided on the input side with a voltage measurement sensor 33 having the function of measuring an output voltage of the first power storing means 15. Upon starting a charge, the voltage measurement sensor 33 inputs a signal S12 in the charge-information processing section 84. If the output voltage (open-circuit voltage) of the first power storing means 15 is within a predetermined range, then the charge-information processing section 84 outputs, to the switching control section 32 of the switching means 30, a signal S5 that the vehicle 50 can be given a boosting charge.

As shown in FIG. 3, the vehicle 50 includes a lock sensor 71, a driving-start checking sensor 72, a parking-brake sensor 73, a charge power-amount indicator 74 and a charge completion alarm 75. The lock sensor 71 detects the charging plug 36 being connected to the charging connector 65 of the vehicle 50, and before a charge starts, inputs a signal S11 in the charge-information processing section 84. The driving-start checking sensor 72 detects the vehicle 50 starting, and before the charge starts, inputs a signal S13 in the charge-information processing section 84. The parking-brake sensor 73 detects the parking brake working to thereby prevent the vehicle 50 from moving, and before the charge starts, inputs a signal S14 in the charge-information processing section 84. The charge power-amount indicator 74 indicates a residual power amount of the second power storing means 85, and during the charge, is given a signal S18 by the charge-information processing section 84.

The charge completion alarm 75 has the function of notifying a driver 88 that the second power storing means 85 has been fully charged. The current sensor 76 measures a charging current sent to the second power storing means 85 while a charge is given, and on the basis of the signal S16 from the current sensor 76, the charge-information processing section 84 decides whether the second power storing means 85 has been fully charged. Upon deciding that the second power storing means 85 has been fully charged, the charge-information processing section 84 outputs a signal S19 to the charge completion alarm 75. The charge completion alarm 75 notifies a cellular phone 89 possessed by the driver 88 by radio that it has been fully charged. If an abnormality in the charging function of the vehicle 50 is detected during the charge, the charge-information processing section 84 outputs the signal S20 to the switching control section 32 of the switching means 30 to allow the switch 31 to make a cut-off motion, thereby stopping charging the vehicle 50. Instead of the cellular phone 89, a vehicle-dedicated communication means or the like may be notified that the charge has been completed.

Figure 6:
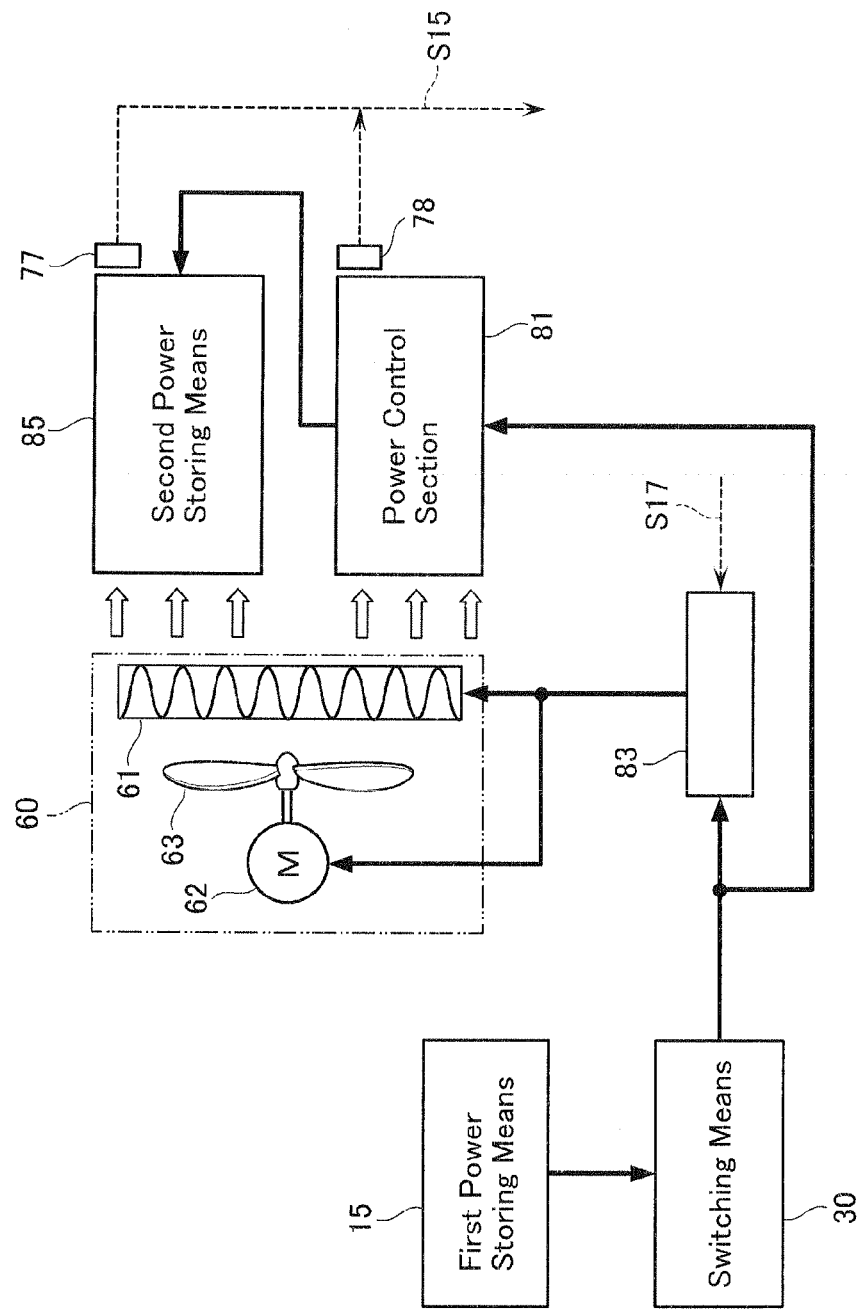
FIG. 6 is a schematic block diagram showing a cooling unit of a vehicle in the apparatus of FIG. 1.

FIG. 6 shows a configuration of the cooling unit 60 cooling a charging system of the vehicle 50. The cooling unit 60 includes an electronic cooling element 61, a motor 62 and a fan 63. The fan 63 is rotated by the motor 62 and thereby blows air to the cooling surface of the electronic cooling element 61. The electronic cooling element 61 works using the Peltier effect and operates with DC power from the first power storing means 15. The charging system of the vehicle 50 is provided at easily heat-generating parts with a first temperature sensor 77 detecting a temperature of the second power storing means 85 and a second temperature sensor 78 detecting a temperature of the power control section 81. A signal S15 from the first temperature sensor 77 and the second temperature sensor 78 is inputted in the charge-information processing section 84. If the temperature of a specified place in the charging system of the vehicle 50 exceeds a predetermined value, the charge-information processing section 84 outputs a signal S17 to the temperature control unit 83, and on the basis of the signal S17, the temperature control unit 83 supplies the cooling unit 60 with DC power from the switching means 30.

At the time of a boosting charge, the power control section 81 controls a great amount of electric power supplied from the first power storing means 15 and thereby the temperature of a semiconductor device thereof may rise. Further, the second power storing means 85 houses a lithium-ion battery thereof densely in a housing space and thereby the temperature of the lithium-ion battery may rise at the boosting-charge time. In the power control section 81 and the second power storing means 85, therefore, if the temperature rises beyond the predetermined value through the boosting charge, they are cooled forcedly with air blown by the cooling unit 60. In order to enhance the capability to cool the semiconductor device of the power control section 81 where the temperature can rise sharply, especially, the electronic cooling element 61 may be attached directly to the power control section 81. Instead of the cooling structure using the electronic cooling element 61 in this implementation, a cooling structure formed by combining a radiator and a motor fan or a cooling structure using air forcedly cooled by a heat exchanger may be employed, as long as DC power supplied from the first power storing means 15 is utilized.

The boosting-charge power supply apparatus 10 according to the present invention is capable of charging a vehicle having a motor as the prime mover thereof, including the vehicle 50 such as a passenger car of FIG. 1, and a sports car 51, a bus 52 and a truck 53. Further, the boosting-charge vehicle includes a transportation vehicle, a railroad car, a streetcar, a monorail car, a construction vehicle, a forklift and the like. According to vehicle types, the cell number, capacity or the like of the second power storing means is different, and thereby, the sports car 51, the bus 52 and the truck 53 include second power storing means 85a, 85b and 85c, respectively, which are different from that of the vehicle 50. The sports car 51, the bus 52 and the truck 53 each have a charge control function suitable for the second power storing means 85a, 85b and 85c, respectively.

Figure 7:
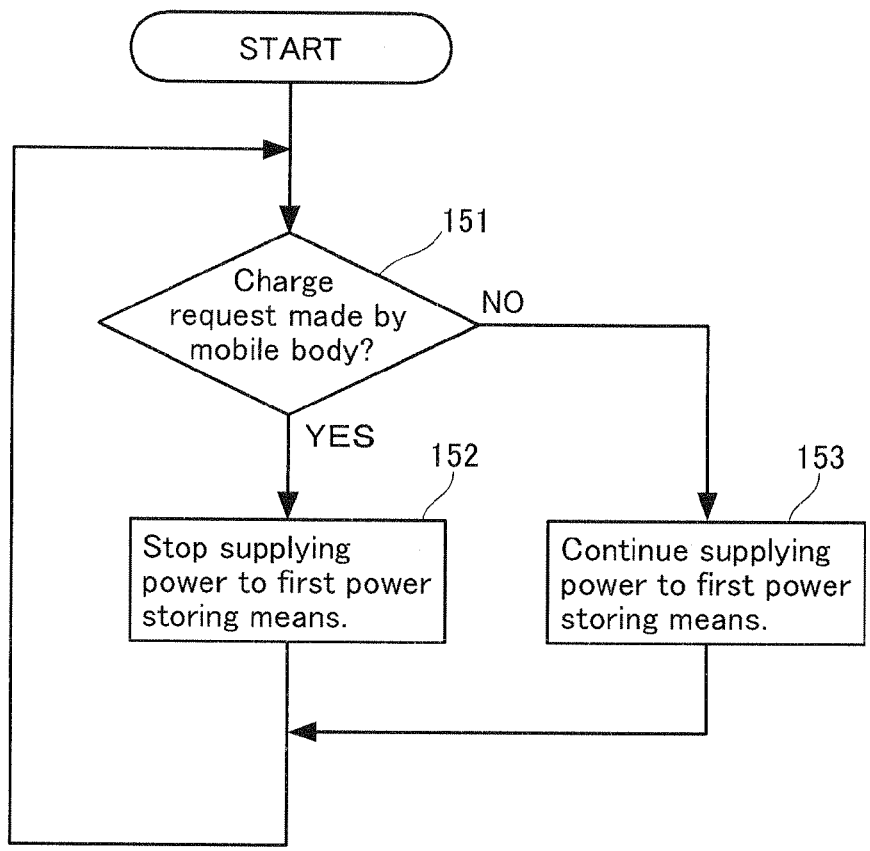
FIG. 7 is a flow chart showing a control procedure of a power-supply controlling means in the apparatus of FIG. 1.

Next, a description will be given about a boosting charge method for a mobile body according to the first embodiment. FIG. 7 shows a control procedure of the power-supply controlling means 12 in which a decision is made whether the vehicle 50 as a mobile body has made a charge request in a step 151, and if the decision is made that the vehicle 50 has made a charge request in the step 151, then the processing goes to a step 152, the switching means 30 outputs the signal S7 to the power-supply controlling means 12 and the rectifier 11 stops supplying DC power to the first power storing means 15. On the other hand, if the decision is made that the vehicle 50 has made no charge request in the step 151, then the processing goes to a step 153 and the rectifier 11 continues supplying DC power to the first power storing means 15. While the rectifier 11 is stopping supplying DC power to the first power storing means 15, the vehicle 50 is charged with DC power from only the first power storing means 15.

Figure 8:
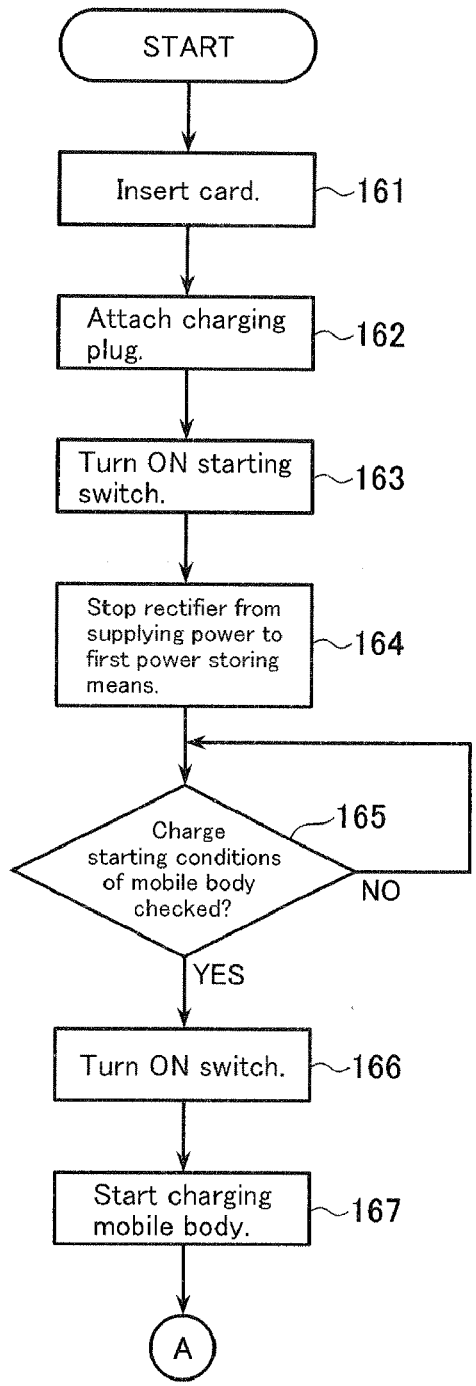
FIG. 8 is a flow chart showing a charging procedure in a boosting-charge power supply method according to the present invention.
Figure 9:
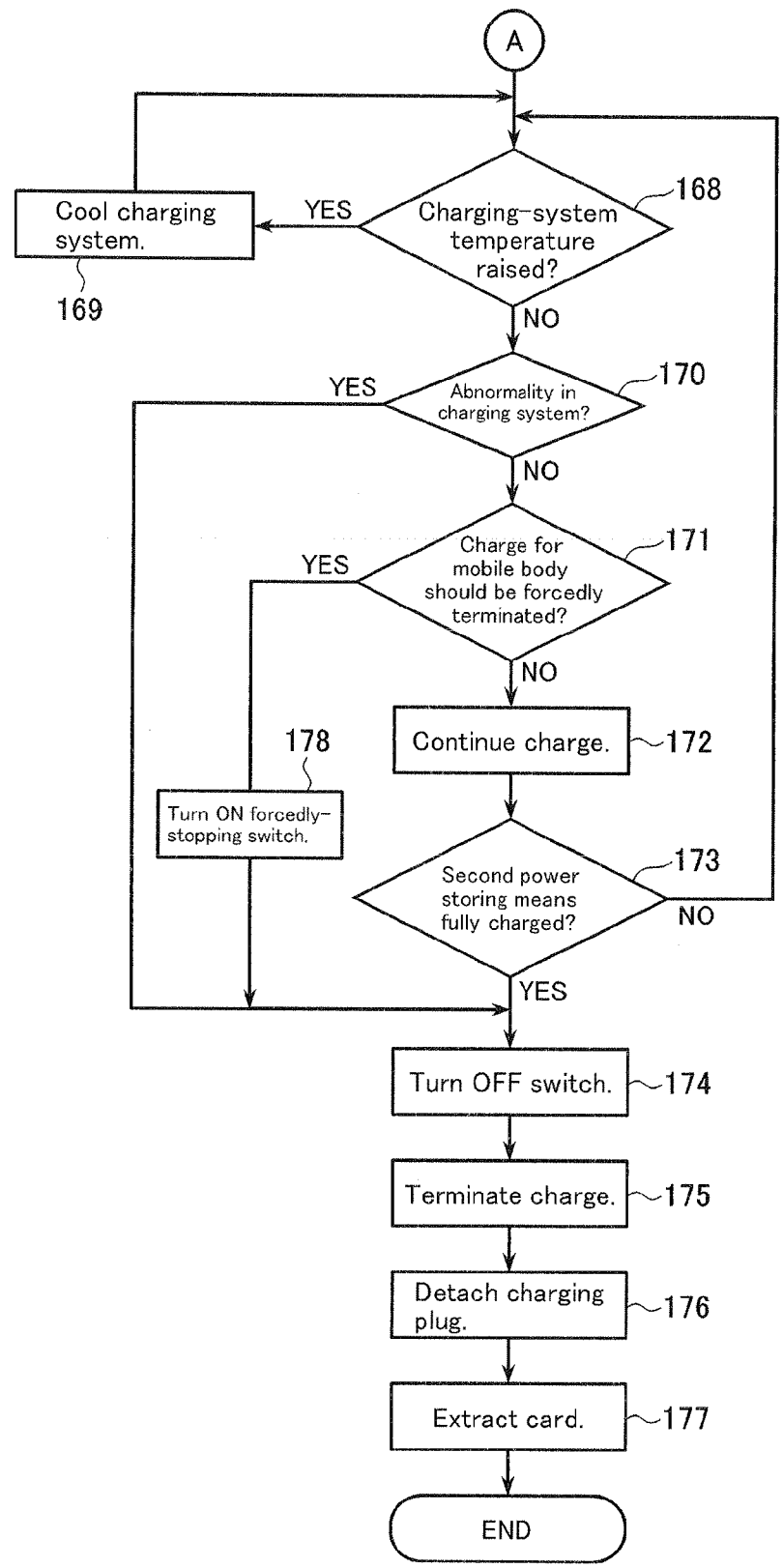
FIG. 9 is a flow chart showing the charging procedure in the boosting-charge power supply method according to the present invention, continuing from FIG. 8.

FIGS. 8 and 9 show an operation procedure from the start to the end of a charge in the boosting charge method for a mobile body. The vehicle 50 arrives at a charging station and stops near a vacant charging stand 21, and before charged, a driving switch (not shown) of the vehicle 50 is turned off and a parking brake (not shown) is put in operation to thereby anchor the vehicle 50 in place. Thereafter, as given in a step 161, a charge card (not shown) equivalent to cash for charging the vehicle 50 is inserted into the card reader 23 of the charging stand 21. Next, in a step 162, the charging cable 35 held on the charging stand 21 is removed and the charging plug 36 at the front end of the charging cable 35 is pushed and attached into the charging connector 65 of the vehicle 50. The charging plug 36 is completely attached thereto to thereby connect the charging circuit 20 to the vehicle 50. On the side of the vehicle 50, the lock sensor 71 checks that the charging plug 36 is attached.

Upon attaching the charging plug 36, the processing goes to a step 163 in which the charge starting switch 24 of the charging stand 21 is turned on. Sequentially, the rectifier 11 stops supplying electric power to the first power storing means 15 in a step 164, and in this state, the rectifier 11 and the first power storing means 15 are electrically cut off, thereby enabling only the first power storing means 15 to supply and charge the vehicle 50 with electric power. After the power supply to the first power storing means 15 makes a stop, the processing goes to a step 165 in which a decision is made whether charge starting conditions of the vehicle 50 are all checked. Specifically, in the step 165, a decision is made whether the signal S11 from each lock sensor 71, the signal S12 from the voltage measurement sensor 33, the signal S13 from the driving-start checking sensor 72 and the signal S14 from the parking-brake sensor 73 have been inputted. If the decision is made at the step 165 that the charge starting conditions have been checked, then the switch 31 for the charging circuit 20 is turned on in the step 166 to thereby start charging the vehicle 50 in the step 167.

Next, upon starting to charge the vehicle 50, the processing goes to a step 168 in which a decision is made whether the temperature of the charging system has risen. If the decision is made at the step 168 that the temperature has exceeded the predetermined value, then in a step 169, the cooling unit 60 cools the power control section 81 and the second power storing means 85. On the other hand, if deciding at the step 169 that the temperature of the charging system is normal, a decision is made in a step 170 whether there is an abnormality in the charge control function or the like of the charging system. If the decision is made at the step 170 that there is an abnormality in the charge control function or the like, then in a step 174, the switch 31 is turned off to thereby stop the charge. On the other hand, if the decision is made at the step 170 that there is no abnormality in the charge control function or the like, then the processing goes to a step 171. In order to forcedly terminate the charge for the vehicle 50 in the step 171, the processing moves to a step 178 in which the charge forcedly-stopping switch 25 is turned on. If the charge forcedly-stopping switch 25 is turned on, then in a step 174, the switch 31 is turned off to thereby stop the charge. Terminating the charge forcedly is effective in giving the charge within a limited time range or in another such case, and a charge stopping timing can be selected by referring to a charging current indicated in the display section 26 of the charging stand 21. In this embodiment, the cooling unit 60 comes into operation after detecting a rise in the temperature of the charging system. However, when the charging system cannot be cooled enough only through spontaneous heat dissipation, the cooling unit 60 may be operated before or simultaneously when the charge starts.

In the step 171, if there is no need to finish charging the vehicle 50, the charge continues in a step 172. In a step 173, a decision is made based on a charging-current measurement value in the second power storing means 85 whether the second power storing means 85 has been fully charged. In other words, the charge-information processing section 84 decides based on the signal S16 from the current sensor 76 whether the second power storing means 85 has been fully charged. At the step 173, if deciding that the second power storing means 85 has been fully charged, then in the step 174, the switch 31 is turned off to thereby terminate the charge. Sequentially, the charging plug 36 is detached from the charging connector 65 of the vehicle 50, and after charged, a charge power amount and a charge power rate are indicated in the display section 26 of the charging stand 21. Thereafter, in a step 177, the charge power rate and the like are electrically written in the charge card (not shown) inserted into the charge card reader 23 of the charging stand 21 and paid on-line to a bank or the like, and then, the charge card is discharged from the charge card reader.

As described so far, a great amount of electric power stored in the first power storing means 15 can be directly utilized for charging the second power storing means 85, thereby charging the vehicle 50 in a short time. Specifically, the first power storing means 15 is capable of storing electric power, for example, hundreds times as great as that of the second power storing means 85 of the vehicle 50, sending the great amount of electric power stored therein directly to the vehicle 50 because a charge control function or the like does not lie between the first power storing means 15 and the vehicle 50, and thereby, as shown in FIG. 1, giving a boosting charge simultaneously to a plurality of vehicles without any large-scale substation.

According to the present invention, the vehicle 50 houses the charge controlling means 80 and thereby controls pure DC power supplied from the first power storing means 15 in such a way that the pure DC power has a charging voltage and a charging current most suitable for charging the second power storing means 85. In other words, since the charge control function significantly affects the life or the like of the second power storing means 85, the charge controlling means 80 is mounted on the vehicle 50, thereby working out a design in such a way that the charging characteristics of the second power storing means 85 are matched to the charge control function. This enables the second power storing means 85 to have as high a performance as expected, thereby enhancing the performance of the vehicle 50. Besides, the vehicle 50 is supplied with high-quality electric power such as pure DC power, and taking this into account, an electric control circuit of the vehicle 50 can be designed. Accordingly, there is little need to consider a ripple, a noise or a surge in DC power supplied to the vehicle 50 given a boosting charge, thereby facilitating a design for an electric control circuit of the vehicle 50 and making the electric control function of the vehicle 50 more reliable.

Although the charging procedure for only the vehicle 50 is described above, as shown in FIG. 1, if the plurality of vehicles are simultaneously charged, then each vehicle is fully charged in a mutually different time because the second power storing means 85, 85a, 85b and 85c thereof each have a capacity and a charge power amount different from each other. Upon starting a charge, the charging current of the vehicle 50, the sports car 51, the bus 52 and the truck 53 become I1, I2, I3 and I4, respectively. Then, each vehicle is continuously charged and thereby the charging current becomes far less than when the charge starts and nearly null as fully charged. When the second power storing means 85*a*, 85*b* and 85*c* have been fully charged, each switching means 30 outputs the power-supply stop signal S7 to the power-supply controlling means 12 to thereby automatically stop the charge for each vehicle.

In this implementation, the cooling unit 60 is used for cooling the charging system, but the electronic cooling element 61 has a cooling surface as well as a heat-generation surface and thereby has the function of regulating the temperature of the vehicle 50, so that the cooling unit 60 not only can cool the charging system, but also can be used as an air conditioner for the vehicle 50. Hence, the cooling unit 60 provided with the electronic cooling element 61 is used as the air conditioner, thereby saving a CFC or the like as a refrigerant for a conventional air conditioner to contribute toward improving the global environment.

Second Embodiment

Figure 10:
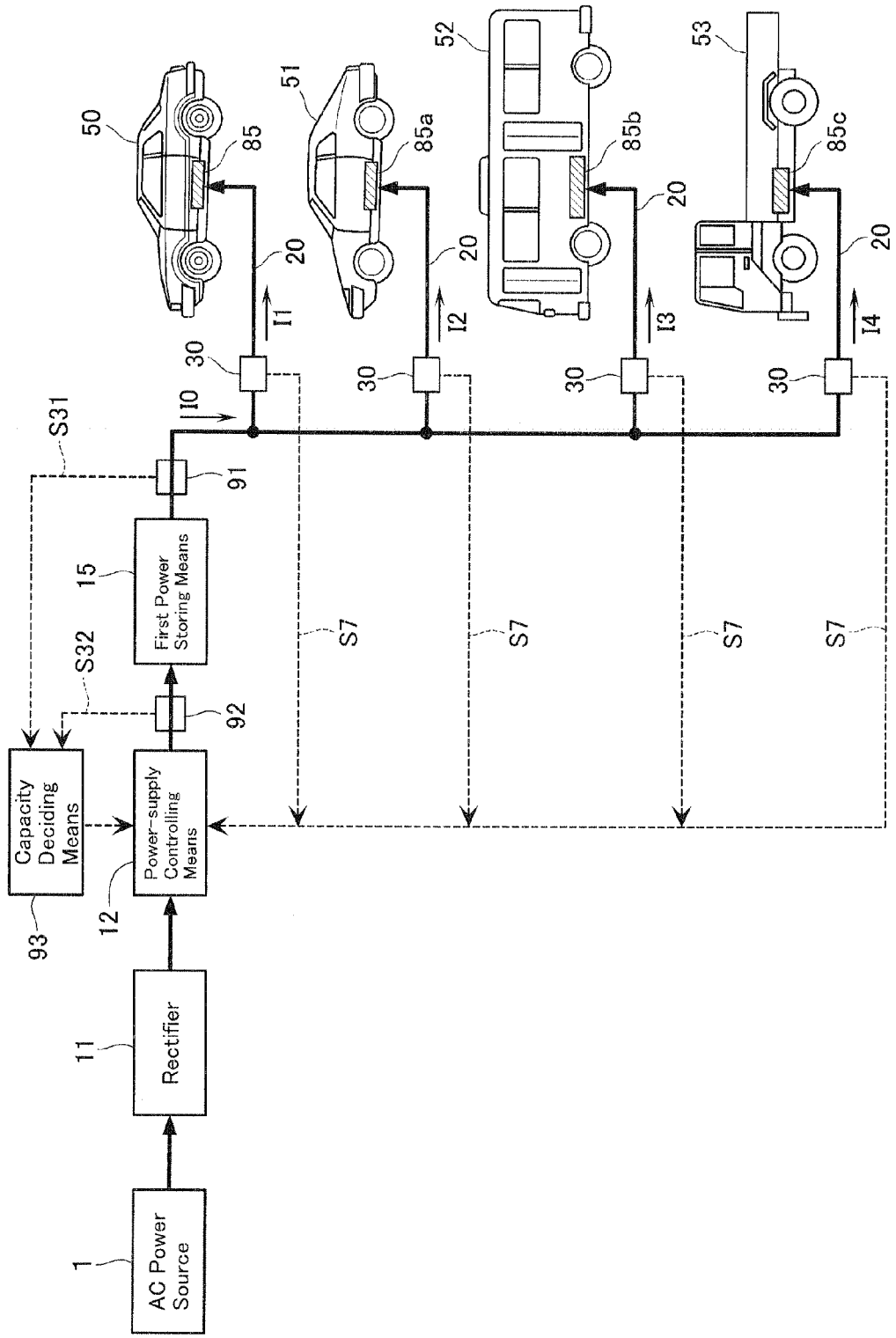
FIG. 10 is a schematic block diagram showing a boosting-charge power supply apparatus according to a second embodiment of the present invention.
Figure 11:
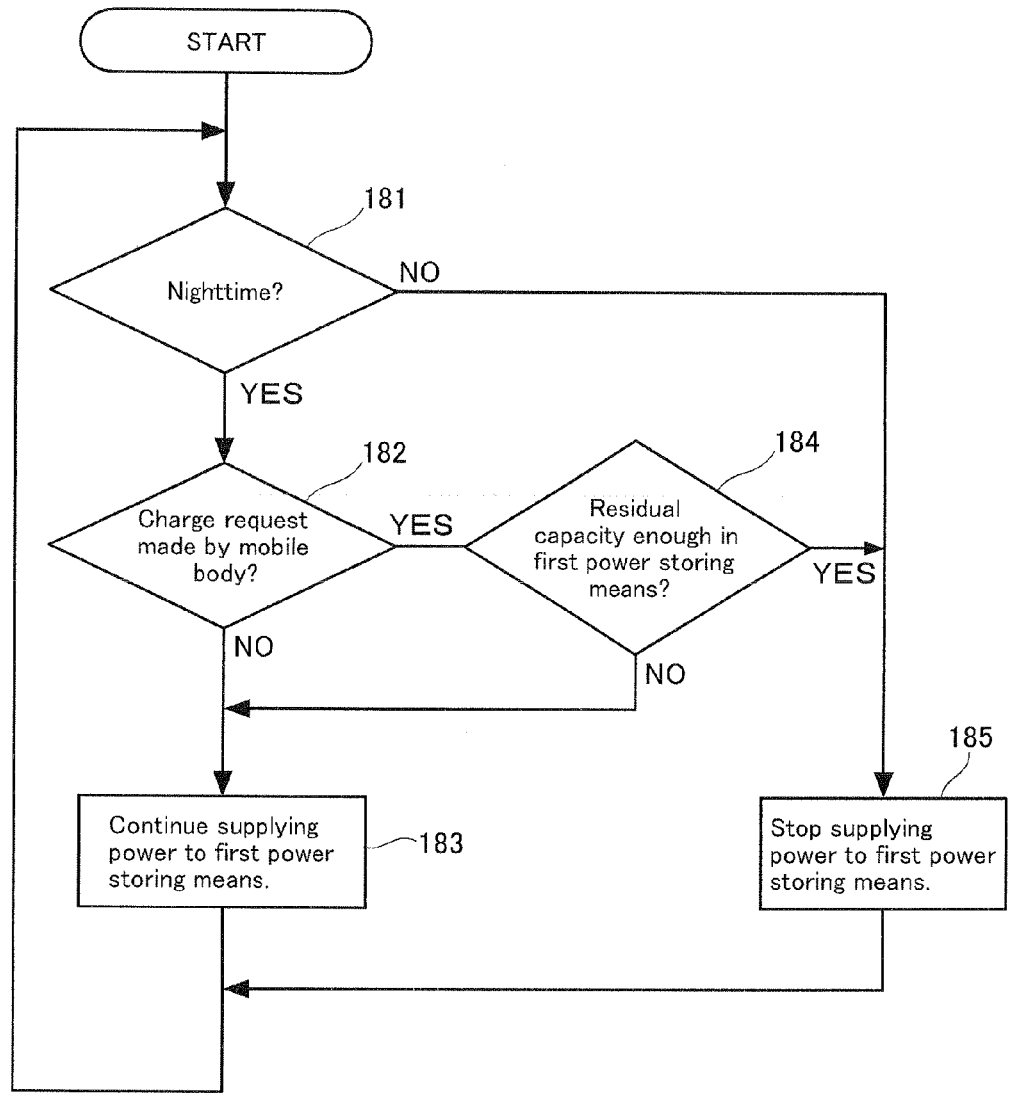
FIG. 11 is a flow chart showing a control procedure of a power-supply controlling means in the apparatus of FIG. 10.

FIGS. 10 and 11 show a boosting-charge power supply apparatus 10 according to a second embodiment of the present invention which has the function of detecting a residual capacity (residual power amount) of the first power storing means 15. The second embodiment is different from the first embodiment in the above respect and charge hours for the first power storing means 15. Otherwise it is the same as the second embodiment, and hence, component elements are given the same reference characters and numerals as those of the first embodiment, as long as the former are identical to the latter, and their description is omitted embodiment. The same rule will also be applied to the other embodiments described later.

In FIG. 10, the first power storing means 15 is provided on the output side with a first power-amount sensor 91 measuring a power amount outputted from the first power storing means 15 and on the input side with a second power-amount sensor 92 measuring a power amount inputted in the first power storing means 15. A signal S31 from the first power-amount sensor 91 and a signal S32 from the second power-amount sensor 92 are inputted in a capacity deciding means 93, and the capacity deciding means 93 calculates a residual capacity of the first power storing means 15 using information based on the signal S31 and the signal S32 and inputs decision information in the power-supply controlling means 12.

FIG. 11 shows a control procedure of the power-supply controlling means 12 according to this implementation. In a step 181, the power-supply controlling means 12 decides using a timer function therein whether it is in the nighttime indicating, for example, 9 p.m.-6 a.m. If deciding at the step 181 that it is not in the nighttime, then in a step 185, the power-supply controlling means 12 stops supplying electric power to the first power storing means 15 while if deciding that it is in the nighttime, then in a step 182, it decides whether the vehicle 50 has made a charge request. If deciding at the step 182 that the vehicle 50 has made no charge request, the processing goes to a step 183 in which the rectifier 11 supplies DC power to the first power storing means 15 and continues charging the first power storing means 15. At the step 182, if deciding that the vehicle 50 has made a charge request, the processing goes to a step 184 in which it decides using the capacity deciding means 93 whether the first power storing means 15 has a sufficient power amount in storage. At the step 184, if deciding that the first power storing means 15 has a sufficient power amount, then in the step 185, the rectifier 11 stops supplying the power to the first power storing means 15 to thereby give a boosting charge to the vehicle 50. On the other hand, if deciding at the step 184 that the first power storing means 15 does not have a sufficient power amount, then in the step 183, the rectifier 11 continues supplying the power and charging the first power storing means 15.

In the thus configured second embodiment, the first power storing means 15 is supplied with electric power only in the nighttime and thereby stored with the inexpensive nighttime electric power. The nighttime electric power stored in the first power storing means 15 can be utilized during the daytime for giving a boosting charge to the vehicle 50, thereby leveling the power load. If the first power storing means 15 only capable of storing a relatively small amount of electric power is provided, then in the nighttime, electric power may be supplied only to the first power storing means 15 without giving a boosting charge to a vehicle. In contrast, the first power storing means 15 capable of storing a power amount great enough may be provided, thereby making a boosting charge constantly feasible and supplying a part of nighttime electric power stored in the first power storing means 15 in the daytime via an inverter or the like to a commercial power-supply system.

Third Embodiment

Figure 12:
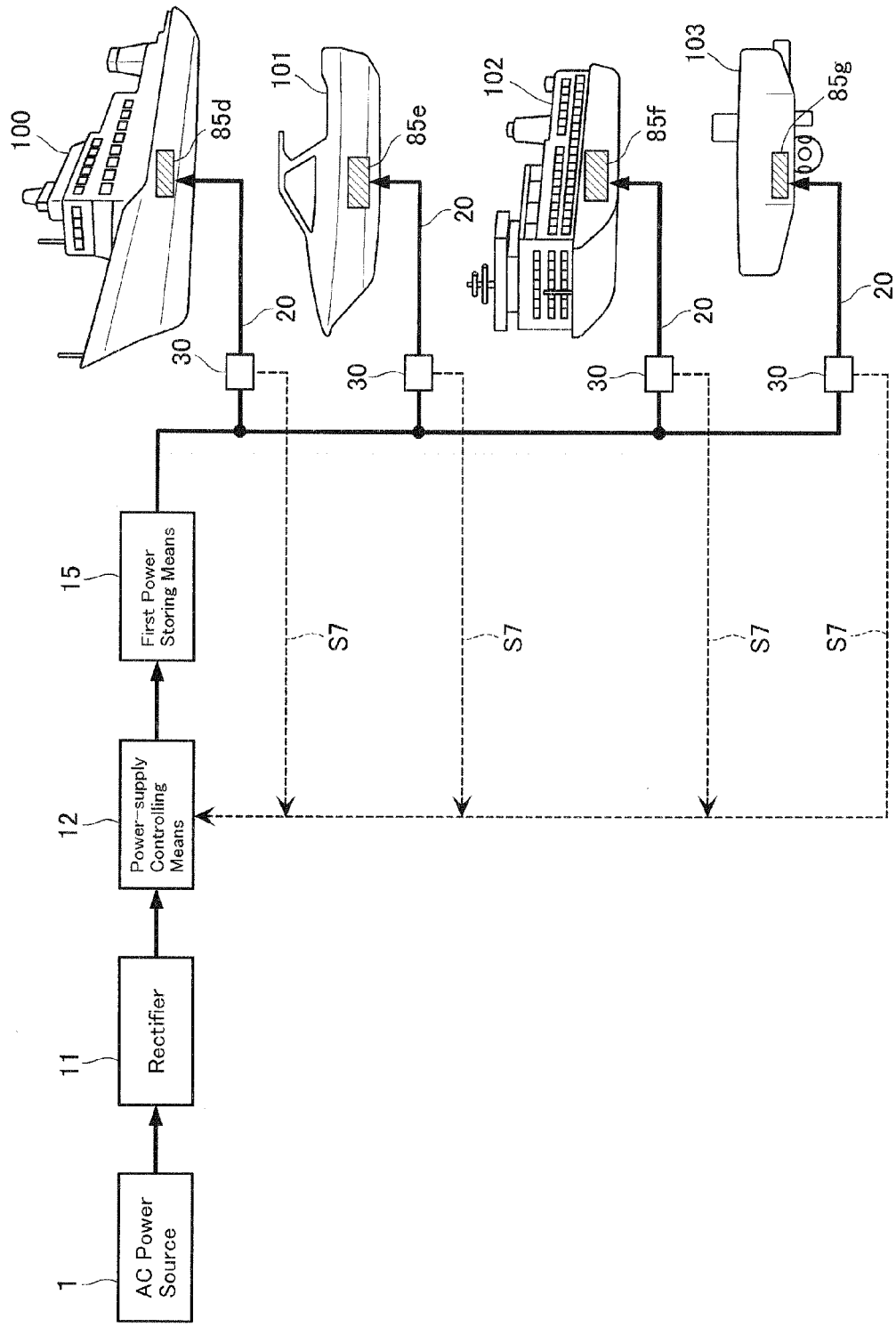
FIG. 12 is a schematic block diagram showing a boosting-charge power supply apparatus according to a third embodiment of the present invention.

FIG. 12 shows a boosting-charge power supply apparatus according to a third embodiment of the present invention which is applied to a boosting charge for a ship as a mobile body. As shown in FIG. 12, a second power storing means 85*d* of a passenger ship 100, a second power storing means 85*e* of a motorboat 101, a second power storing means 85*f* of a car ferry 102 and a second power storing means 85*g* of a bathyscaphe 103 can be supplied with electric power for charge through each charging circuit 20 connected in parallel to the first power storing means 15. In view of improvements in the global environment, more ships propelled by electric power should desirably be used. As a prime mover for shipping, for example, a high-temperature superconducting motor having a high performance may desirably be employed. In this implementation, the pure DC power supplied from the first power storing means 15 is controlled to charge each ship, and thereby, the charging voltage and charging current for each second power storing means 85*d*, 85*e*, 85*f* and 85*g* are most suitably controlled. This makes it possible to give a boosting charge simultaneously to various ships.

Fourth Embodiment

Figure 13:
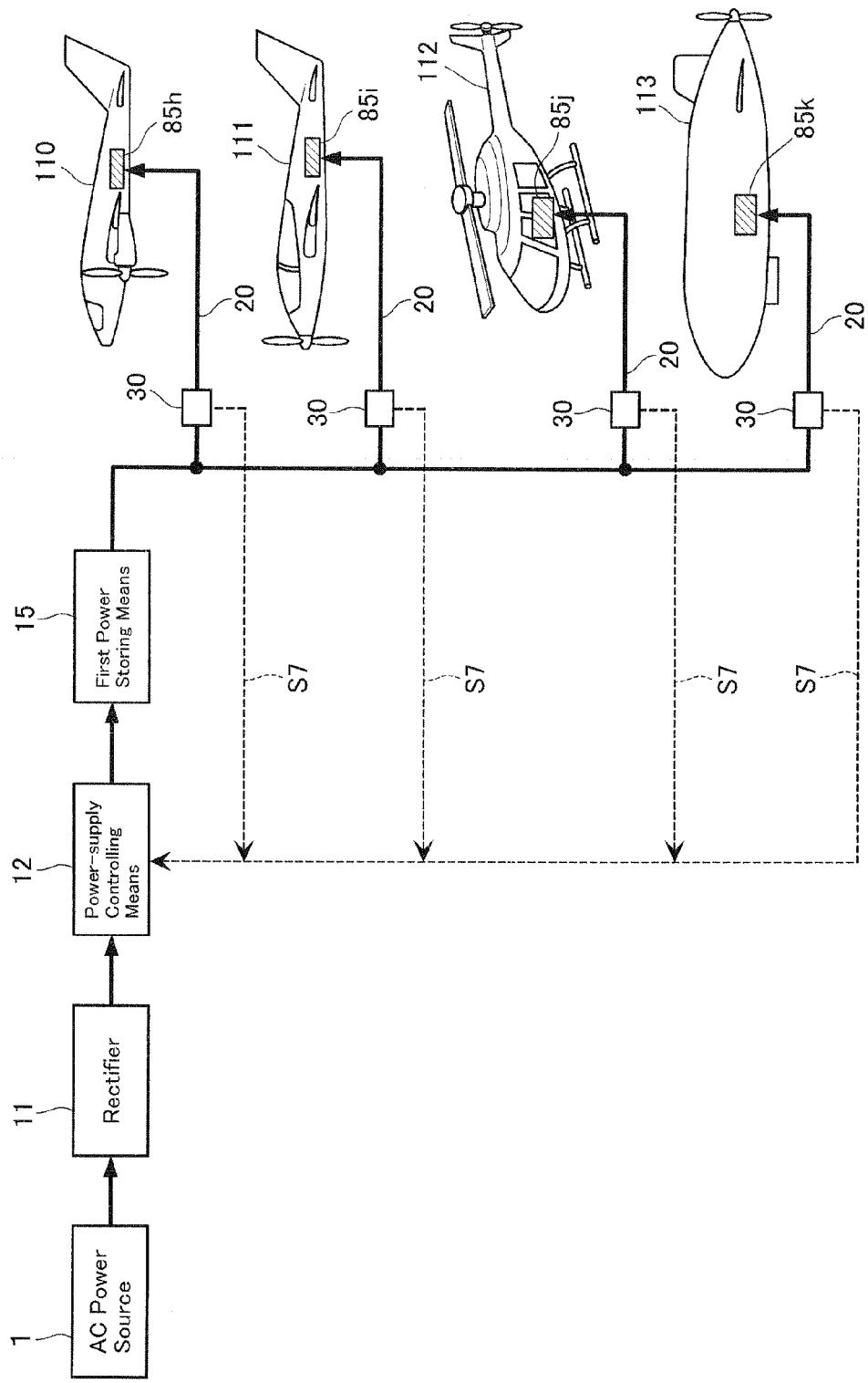
FIG. 13 is a schematic block diagram showing a boosting-charge power supply apparatus according to a fourth embodiment of the present invention.

FIG. 13 shows a boosting-charge power supply apparatus according to a fourth embodiment of the present invention which is applied to a boosting charge for an aircraft as a mobile body. As shown in FIG. 13, a second power storing means 85*h* of a twin-engine aircraft (including a vertical take-off and landing (VTOL) aircraft) 110, a second power storing means 85*i* of a single-engine aircraft 111, a second power storing means 85*j* of a helicopter 112 and a second power storing means 85*k* of an airship 113 can be supplied with electric power for charge through each charging circuit 20 connected in parallel to the first power storing means 15. In view of improvements in the global environment, more aircraft propelled by electric power should desirably be used. Each aircraft makes a flight by rotating a propeller or a rotor blade with electric power from the first power storing means 15. In this implementation, the pure DC power supplied from the first power storing means 15 is controlled to charge each aircraft, and thereby, the charging voltage and charging current for each second power storing means 85*h*, 85*i*, 85*j* and 85*k* are most suitably controlled. This makes it possible to give a boosting charge simultaneously to various aircraft.

Fifth Embodiment

Figure 14:
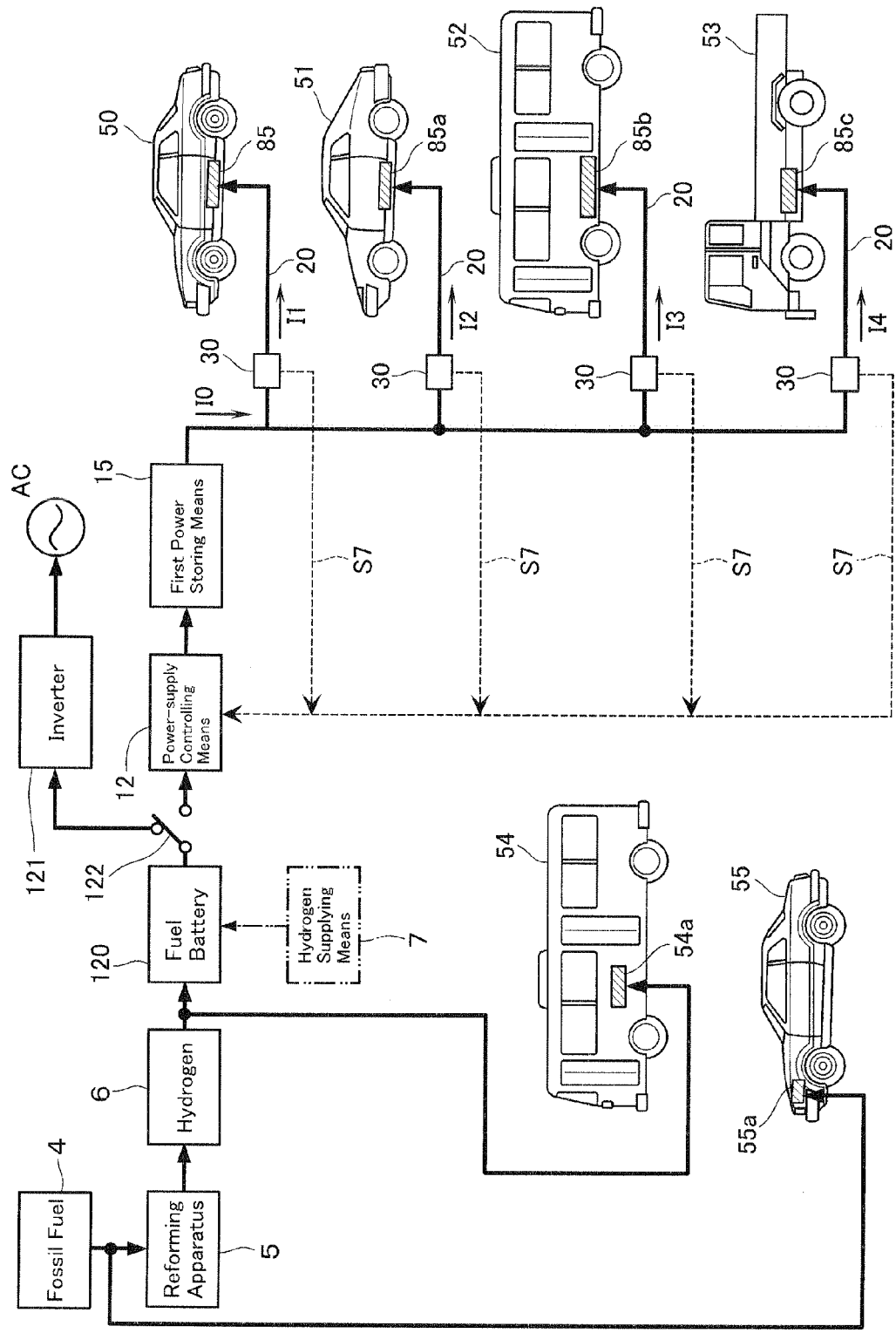
FIG. 14 is a schematic block diagram showing a boosting-charge power supply apparatus according to a fifth embodiment of the present invention.

FIG. 14 shows a boosting-charge power supply apparatus according to a fifth embodiment of the present invention which is a boosting-charge system for a mobile body using electric power from a fuel battery. In FIG. 14, reference numeral 4 denotes a fossil fuel stored in an underground tank of a filling station. The fossil fuel 4 inside of the underground tank is supplied to a reforming apparatus 5 on the ground, then the reforming apparatus 5 reforms the fossil fuel 4 into hydrogen 6, and the hydrogen 6 is supplied to a fuel battery 120. The fuel battery 120 has the function of generating DC power with the supplied hydrogen 6 and oxygen in the air, and as the fuel battery 120, for example, a solid-oxide fuel battery having a high power-generation efficiency is employed. In order to heighten the power-generation efficiency of the fuel battery 120, a part of heat generated by the fuel battery 120 is converted into DC power, for example, via a thermoelectric exchange element (Seebeck element), the Stirling engine or the like. As the underground tank storing the fossil fuel 4, an existing underground tank of a filling station can be used, thereby reducing installation investment costs.

The DC power outputted from the fuel battery 120 can be supplied to the power-supply controlling means 12 or an inverter 121. The fuel battery 120 is provided on the output side with a change-over switch 122 making a change-over motion to thereby supply the DC power from the fuel battery 120 to either the power-supply controlling means 12 or the inverter 121. The inverter 121 converts the DC power from the fuel battery 120 into AC power and supplies the AC power to a commercial power-supply system. The change-over switch 122 is set to supply the DC power from the fuel battery 120 only to the inverter 121 during the daytime, and thereby, the fuel battery 120 supplied the first power storing means 15 with electric power only during the daytime. The first power storing means 15 stores the DC power from the fuel battery 120 during the nighttime and charges the vehicle 50 or the like only in the daytime.

Although the reforming apparatus 5 supplies the hydrogen 6 to the fuel battery 120, a hydrogen supplying means 7 such as a tank truck can also supply it. In a filling station provided with the boosting-charge power supply apparatus 10, the reforming apparatus 5 can supply the hydrogen 6 to a fuel-battery powered vehicle 54 housing a fuel battery 54a. Further, the fossil fuel 4 can be supplied to a vehicle 55 housing an engine 55a. Therefore, the reforming apparatus 5 and the fuel battery 120 are employed to thereby not only subject the vehicle 50 to a boosting charge but also subject the fuel-battery powered vehicle 54 and the general vehicle 55 to a fuel supply, so that a variety of energy can be supplied at a single filling station.

As described above, in the fifth embodiment, the power supplying means is formed by the fuel battery 120, and hence, electric power can be generated even in a location where no commercial electric power is supplied, thereby facilitating the construction of a charging station. Besides, the fuel battery 120 can supply DC power to a commercial power-supply system, thereby supplying clean electrical energy to a specific area to realize decentralized power generation. Further, electric power stored during the nighttime in the first power storing means 15 can be used for giving a boosting charge to the vehicle 50 in the daytime, thereby leveling the power load. Still further, the fuel battery 120 utilizes as a fuel thereof hydrogen obtained by reforming a fossil fuel, thereby realizing an electric-vehicle society where fossil fuels are moderately consumed.

Sixth Embodiment

FIGS. 15 to 18 show a power generation system according to a sixth embodiment of the present invention which gives a mobile body a boosting charge using electric power generated with renewable energy (natural energy). The natural energy targeted by this implementation is a water stream in a river and an ocean current in a sea. This embodiment can be applied for both a water stream and an ocean current, but herein, an example is given of a power generation system in which a water stream in a river is utilized.

Figure 17:
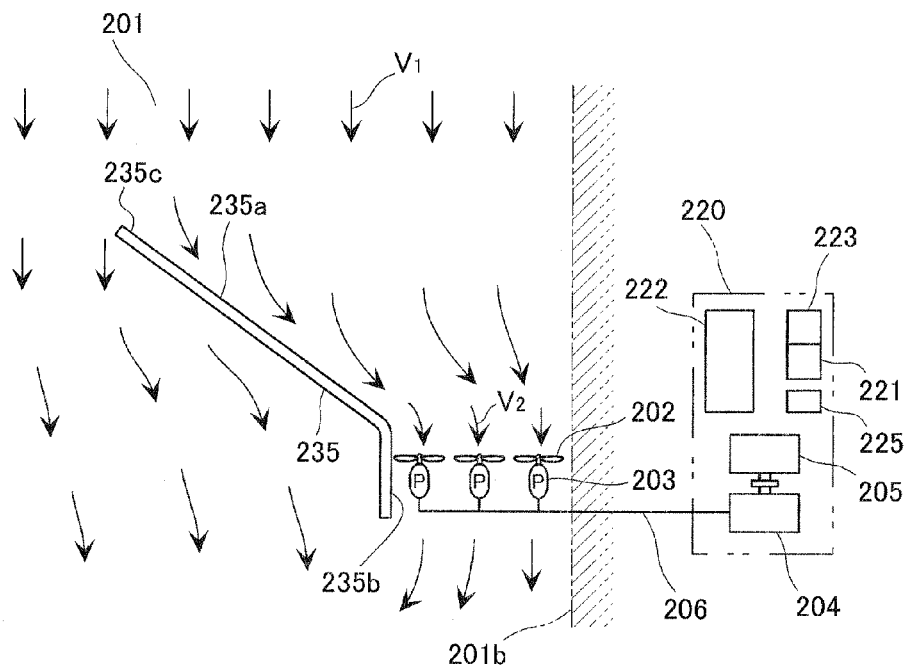
FIG. 17 is a plan view of the power generation system of FIG. 15.

In FIG. 17, three first hydraulic turbines 202 are provided in water W1 near a riverbank 201b in a river 201. Although a propeller turbine is used as the first hydraulic turbine 202 in this implementation, various types such as Savonius and Darrieus can be used, as long as it can obtain a driving torque using a water stream. The first hydraulic turbine 202 is attached to the revolving shaft of a pump 203, and the pump 203 is revolved by the first hydraulic turbine 202. In order to secure a sufficient quantity of the water W1 discharged from the pump 203, a speed-increasing system (not shown) may desirably be provided between the first hydraulic turbine 202 and the pump 203. As the pump 203, based on the pressure and flow rate of water supplied to a second hydraulic turbine 204, the most suitable type and size are selected. In this embodiment, three such first hydraulic turbines 202 and three such pumps 203 are provided. Each pump 203 is fixed to a foundation laid on the bottom of the river 201. The first hydraulic turbines 202 are disposed underwater. However, in order to make their installation work easier, the first hydraulic turbines 202 and the pumps 203 may be configured so as to be supported on the side of the ground. It is desirable from the viewpoint of maintenance and inspection that each pump 203 is fixed as a single unit to a metal frame (not shown) moving up and down in such a way that each first hydraulic turbine 202 and each pump 203 can be raised from the water surface. To each pump 203, piping 206 is connected which extends to a power-generation house 220 built on the ground.

The piping 206 includes a suction pipe 206a and a discharge pipe 206b. In the suction pipe 206a for each pump 203, a filter 212 is attached to an end thereof. If a water stream of the river 201 rotates the first hydraulic turbine 202 and its rotation drives each pump 203, a part of the water W1 of the river 201 is drawn up via the filter 212 to the pump 203. The water W1 drawn up by the pump 203 is supplied through the discharge pipe 206b to the side of the second hydraulic turbine 204. In the discharge pipe 206b on the downstream side of the pump 203, a pressure control valve 207 is provided as the pressure raising means. This pressure control valve 207 has the function of raising the pressure of the water W1 discharged from each pump 203 to a predetermined pressure. The pressure of the water W1 controlled by the pressure control valve 207 is set to an optimum value according to the type of the second hydraulic turbine 204. The pressure raising means is not limited to the pressure control valve 207, and thus, it may be a regulating valve or the like which throttles a flow-passage cross section to thereby heighten the pressure of the water W1. The pressure raising means may desirably be arranged in a hydraulic tank or the like which has the function of absorbing a pulsation of the water W1 discharged from the pump 203.

The power-generation house 220 is provided with the second hydraulic turbine 204, a dynamo 205 and the like. The second hydraulic turbine 204 and the dynamo 205 are fixed on a foundation laid on the ground. To the output shaft of the second hydraulic turbine 204, the revolving shaft of the dynamo 205 is connected. The dynamo 205 is revolved by the driving torque of the second hydraulic turbine 204, so that it generates AC power. The second hydraulic turbine 204 is provided with a speed governor 208. The speed governor 208 has the function of automatically adjusting the quantity of water supplied to the second hydraulic turbine 204 in line with a variation in the load of the dynamo 205. This helps prevent a variation in the load of the dynamo 205 from causing variations in the revolution of the second hydraulic turbine 204 and the dynamo 205. Consequently, the frequency of the AC power can be kept constant. The water W1 discharged from the second hydraulic turbine 204 passes through the downstream pipe 206c and returns from an outlet 206d to the upstream side of the first hydraulic turbines 202.

The second hydraulic turbine 204 is configured by a Francis hydraulic turbine or a Pelton hydraulic turbine of a standard type, or the like, which is employed in a dam-type or conduit-type power station or such another. The dynamo 205 is configured by a synchronous dynamo similar to the one employed in hydroelectric power station such as a dam-type or conduit-type power station. The reason that the plurality of first hydraulic turbines 202 and pumps 203 are provided is because the second hydraulic turbine 204 having a large size needs to be driven by a great volume of such water W1 supplied from the river 201. In other words, If the numbers of the first hydraulic turbines 202 and the pumps 203 is increased, the second hydraulic turbine 204 as large as the one of a dam-type or conduit-type power station can be rotated at high speed. Thereby, even in power generation using a water stream in the river 201, electric power can be generated on a relatively massive scale. At the same time, compared with the structure where a dynamo is disposed underwater, the maintenance becomes easier. Besides, as the second hydraulic turbine 204 and the dynamo 205, standard-type ones used in an ordinary hydroelectric power station are employed, so that the cost taken to invest in the power generator can be cut down.

In conventional hydroelectric power generation, the difference in height by which water falls is used to thereby drive a hydraulic turbine, and hence, electric power cannot be generated without a difference in height. In contrast, the power generation system according to this embodiment increases the pressure energy of the water W1 drawn up by allowing the pumps 203 driven by the first hydraulic turbines 202 to collaborate with the pressure raising means such as the pressure control valve 207, and hence, it differs in the means for heightening the energy density from the conventional hydroelectric power generation. Therefore, the power generation system according to this embodiment is capable of generating electric power, even if the second hydraulic turbine 204 driving the dynamo 205 lies above the position where the pumps 203 suck the water W1, without any difference in height by which water falls.

As shown in FIG. 17, on the upstream side of the first hydraulic turbines 202, the speed-increasing weir 235 is fixed on the riverbed. As the speed-increasing weir 235, various types can be employed, including the one which is made of concrete, formed by laying stones, formed by a waterproof film or made of iron, as long as it can concentrate the flow of the water W1 at a specific place. For example, the speed-increasing weir 235 can be easily obtained by driving a series of steel sheet pilings into the riverbed. An end part 235c of the speed-increasing weir 235 on the upstream side is far away from the riverbank 201b. An oblique part 235a of the speed-increasing weir 235 extends obliquely across from near the riverbank 201b up to the vicinity of the first hydraulic turbines 202. A straight part 235b of the speed-increasing weir 235 extends in the same direction as the river flow from near the first hydraulic turbines 202 on the upstream side up to the vicinity of the pumps 203 on the downstream side. On the upstream side from the speed-increasing weir 235, the water flow is set to a velocity V1. In the place where the first hydraulic turbines 202 lie, the water W1 flows at a velocity V2 far higher than the velocity V1 along the speed-increasing weir 235.

In this implementation, the top part of the speed-increasing weir 235 is exposed from the water surface, but it can also be located slightly under the water surface. The height of the speed-increasing weir 235 is set to a height up to which the water W1 is hindered from overflowing when the volume of water increases in a flood or the like. When the water volume rises, the water W1 flows downstream over the speed-increasing weir 235. In a mountain area or another such place where water flows fast, there is no need for the speed-increasing weir 235, while in a plain area, water flows more gently than a mountain area. However, if the speed-increasing weir 235 for concentrating the flow of the water W1 is employed, the first hydraulic turbines 202 can be driven by the higher energy-density flow of the water W1.

The AC power generated by the dynamo 205 is supplied via a switch 211 to a person who demands it or a converter 221. The DC power obtained after a conversion by the converter 221 is supplied to a battery 222 as the power storing means. The destination to which the electric power is supplied is automatically changed by the switch 211 in accordance with variations in load. The battery 222 is formed by a valve-regulated lead-acid battery for storing electric power. It is desirable that the battery 222 has a power storage capacity for storing the full power amount generated in the nighttime by the dynamo 205. The DC power stored in the battery 222 is converted into AC power by a converter 223. In accordance with variations in load, a controller 225 has the function of supplying the DC power stored in the battery 222 via the converter 223 to a person who demands it. A solar battery 224 supplies electric power to the controller 225. For example, in an overseas undeveloped region, at first, using electric power from the solar battery 224, the controller 225 is operated to start power generation. In the operation after this, electric power is supplied via the converter 221 to the controller 225.

Figure 18:
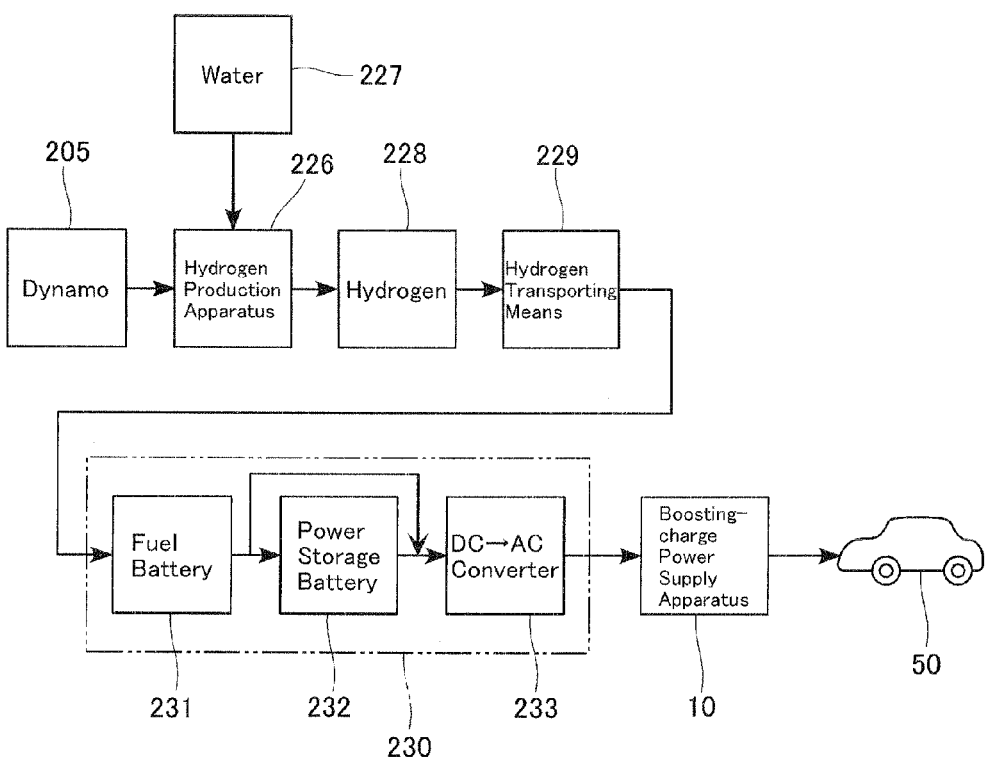
FIG. 18 is a block diagram showing an example in which the power generation system of FIG. 15 is applied to boosting charge for a mobile body.

As shown in FIG. 18, a part of the electric power from the dynamo 205 is designed to be sent, for example, to a hydrogen production apparatus 226. Water 227 is supplied to the hydrogen production apparatus 226. If the hydrogen product ion apparatus 226 is installed near the river 201, the water 227 from the river 201 can be easily supplied to the hydrogen production apparatus 226. In the hydrogen production apparatus 226, water is electrolyzed using the electric power from the dynamo 205, so that hydrogen 228 can be produced. If the system of FIG. 18 is constructed, for example, near a river in an overseas region having a heavy rainfall, a large amount of power can be obtained. If this large amount of power is supplied through a transmission line to the hydrogen production apparatus 226 constructed near a port, a great quantity of hydrogen can be produced near the port. The hydrogen 228 produced by the hydrogen production apparatus 226 is liquefied and transported to an overseas place where there is a demand for it by a hydrogen transporting means 229 such as a ship. The reason that the electric power generated from the dynamo 205 is transported by ship after transformed into liquid hydrogen is because power transmission to overseas regions by means of transmission lines causes a great power loss to raise the unit cost of power generation.

The hydrogen 228 which has arrived at a port of a place where there is a demand for it is supplied, for example, to a power station 230 built near the port. The power station 230 is provided with a fuel battery 231, a battery 232 for power storage and a converter 233. The large-sized fuel battery 231 generates DC power using the supplied hydrogen 228. A part of the DC power outputted from the fuel battery 231 is stored in the power-storage battery 232. The DC power from the fuel battery 231 is converted into an alternating current by the converter 233 and is sent to a person who demands it. If a ship utilizing as energy thereof electric power stored in a power storing means such as a large-capacity battery or hydrogen is used as the hydrogen transporting means 229, then in a process from power generation in the river 201 to power generation in the power station 230, no carbon dioxide is emitted at all. This makes it possible to restrain global warming due to carbon dioxide emission.

Figure 15:
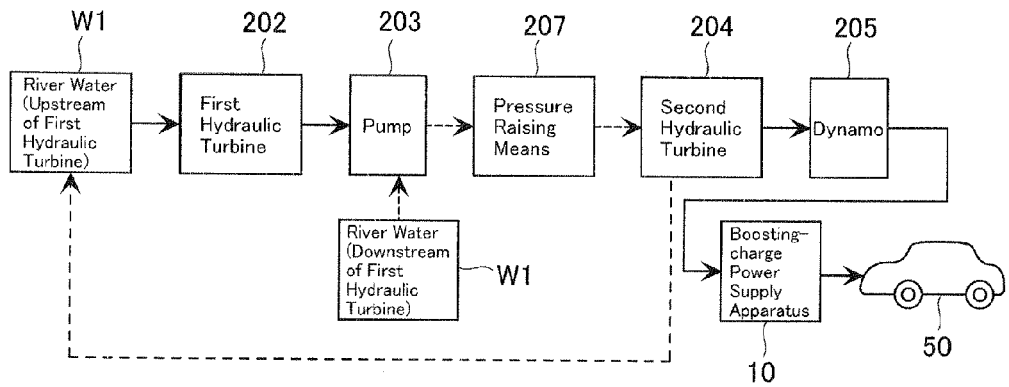
FIG. 15 is a block diagram showing a power generation system related to a boosting-charge power supply apparatus according to a sixth embodiment of the present invention.
Figure 16:
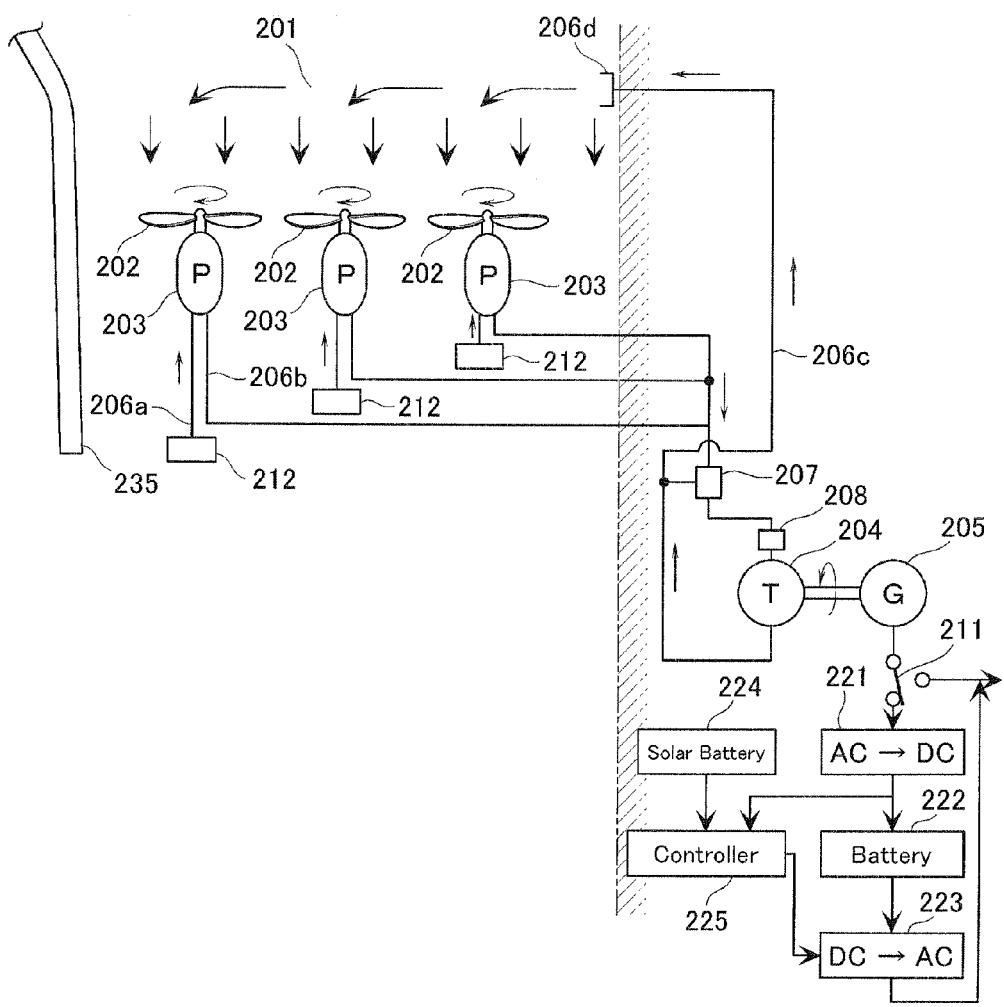
FIG. 16 is a plan view of a main part of the power generation system of FIG. 15.

In order to restrain global warming due to carbon dioxide emission, it is desirable that electric power produced by the dynamo 205 is supplied to a vehicle which runs by use of a motor. For example, as shown in FIG. 15, this electric power generated with natural energy is supplied to the boosting-charge power supply apparatus 10 according to the present invention and as shown in FIG. 18, electric power obtained by utilizing the hydrogen 228 produced using electric power generated with natural energy is supplied to the boosting-charge power supply apparatus 10 according to the present invention. In this way, the boosting-charge power supply apparatus 10 can utilize the electric power coming from natural energy for charging the vehicle 50, thereby reducing the amount of carbon-dioxide emission significantly.

Hereinbefore, the first to sixth embodiments of the present invention are described in detail. However, concrete configurations thereof are not limited to these embodiments. Therefore, unless changes and modifications in design depart from the scope of the present invention, they should be construed as being included therein. For example, the mobile body subjected to a boosting charge is a so-called transportation machine including a vehicle, a ship and an aircraft. It is not limited to a long-distance mobile body and also includes an industrial machine moving only within a limited range such as a construction machine, a robot and a forklift. Further, the fossil fuel used for a fuel battery as the power supplying means may be either liquid or gas. Still further, the power generation using renewable energy (natural energy) is not limited to hydroelectric or ocean-current power generation, and of course, it also includes wind, solar-photovoltaic or biomass power generation or the like.

The invention claimed is:

1. A boosting-charge power supply apparatus which supplies electric power for boosting charge to a mobile body having a boosting-charge control function, comprising:
a power supplying means for supplying DC power;
a first power storing means for storing DC power from the power supplying means and outputting pure DC power;
a charging circuit which sends pure DC power from the first power storing means directly to a mobile body including a second power storing means for storing DC power from the first power storing means; and
a power-supply controlling means for stopping the power supplying means from supplying electric power to the first power storing means while the first power storing means is supplying electric power to charge the second power storing means.

2. The boosting-charge power supply apparatus according to claim 1, wherein the first power storing means has a plurality of the charging circuits connected in parallel thereto to thereby give a boosting charge simultaneously to a plurality of the mobile bodies.

3. The boosting-charge power supply apparatus according to claim 1, wherein the charging circuit includes a switching means for switching the charging circuit at least based on charge information from the mobile body.

4. The boosting-charge power supply apparatus according to claim 1, wherein the power supplying means is formed by a rectifier converting inputted AC power into DC power.

5. The boosting-charge power supply apparatus according to claim 4, wherein the power-supply controlling means has the function of allowing the rectifier to supply DC power to the first power storing means only for specified hours.

6. The boosting-charge power supply apparatus according to claim 1, wherein the power supplying means is formed by a fuel battery.

7. The boosting-charge power supply apparatus according to claim 1, wherein the first power storing means is formed by at least either of a storage battery and an electric double-layer capacitor.

8. The boosting-charge power supply apparatus according to claim 4, wherein the AC power inputted in the rectifier is generated with renewable energy.

9. The boosting-charge power supply apparatus according to claim 6, wherein the fuel battery utilizes, as a fuel, hydrogen obtained by reforming a fossil fuel.

10. The boosting-charge power supply apparatus according to claim 6, wherein the fuel battery utilizes, as a fuel, hydrogen produced using electric power generated with renewable energy.

11. The boosting-charge power supply apparatus according to claim 6, wherein the fuel battery has an inverter connected thereto converting DC power outputted from the fuel battery into AC power and supplying the AC power to a commercial power-supply system.

12. The boosting-charge power supply apparatus according to claim 1, wherein the mobile body is at least any one of a vehicle, a ship and an aircraft.

13. A boosting-charge power supply method which supplies electric power for boosting charge to a mobile body having a boosting-charge control function, comprising the steps of:
storing DC power from a power supplying means in a first power storing means;
sending pure DC power outputted from the first power storing means, through a charging circuit, directly to a mobile body including a second power storing means for storing DC power from the first power storing means; and
stopping the power supplying means from supplying electric power to the first power storing means while the first power storing means is supplying electric power to charge the second power storing means.

14. The boosting-charge power supply method according to claim 13, wherein the first power storing means has a plurality of the charging circuits connected in parallel thereto to thereby give a boosting charge simultaneously to a plurality of the mobile bodies.

15. The boosting-charge power supply method according to claim 13, wherein a part of DC power supplied from the first power storing means is used for cooling a heat-generation part in a charging system of the mobile body.

16. The boosting-charge method according to claim 13, wherein the mobile body is at least any one of a vehicle, a ship and an aircraft.

* * * * *